US012711251B2

(12) United States Patent
Smith et al.

(10) Patent No.: US 12,711,251 B2
(45) **Date of Patent: *Aug. 18, 2026**

(54) SYSTEM AND METHODS FOR USING CIPHER OBJECTS TO PROTECT DATA

(71) Applicant: SERTAINTY CORPORATION, Nashville, TN (US)

(72) Inventors: Gregory Scott Smith, Madison, TN (US); Melani Leigh Smith Weed, Franklin, TN (US); Daniel Michael Fischer, Brentwood, TN (US); Elke M. Ridenour, Brentwood, TN (US)

(73) Assignee: Sertainty Corporation, Nashville, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/623,627

(22) Filed: Apr. 1, 2024

(65) Prior Publication Data

US 2024/0265120 A1 Aug. 8, 2024

Related U.S. Application Data

(63) Continuation of application No. 17/377,595, filed on Jul. 16, 2021, now Pat. No. 12,072,989, which is a (Continued)

(51) Int. Cl.

| | |
|---|---|
| ***G06F 21/60*** | (2013.01) |
| ***H04L 9/40*** | (2022.01) |
| ***H04W 4/18*** | (2009.01) |

(52) U.S. Cl.

CPC .......... *G06F 21/604* (2013.01); *G06F 21/606* (2013.01); *H04L 63/104* (2013.01); (Continued)

(58) Field of Classification Search

CPC ................ G06F 21/604; G06F 21/606; G06F 2221/2107; G06F 2221/2141; (Continued)

(56) References Cited

U.S. PATENT DOCUMENTS

| | | | |
|---|---|---|---|
| 5,276,444 | A | 1/1994 | McNair |
| 5,382,983 | A | 1/1995 | Kwoh et al. |

(Continued)

FOREIGN PATENT DOCUMENTS

| | | | |
|---|---|---|---|
| CA | 2167543 | A1 | 7/1997 |
| CA | 2217825 | A1 | 4/1998 |

(Continued)

OTHER PUBLICATIONS

Ajluni, C., "Security Techniques Ensure Privacy," Electronic Design, Apr. 1995, pp. 83-84 (abstract).

(Continued)

*Primary Examiner* — Aravind K Moorthy

(74) *Attorney, Agent, or Firm* — Goodwin Procter LLP

(57) ABSTRACT

Systems, methods, and devices configured to build and utilize an intelligent cipher transfer object are provided. The intelligent cipher transfer object includes a set of participants protected by cloaking patterns. A portable dynamic rule set, which includes executable code for managing access to the protected set of participants, is included within the intelligent cipher transfer object. For a given user, the intelligent cipher transfer object may provide access to some of the participants while preventing access to other participants, based on the portable dynamic rule set therein.

18 Claims, 14 Drawing Sheets

Related U.S. Application Data continuation-in-part of application No. 16/657,412, filed on Oct. 18, 2019, now Pat. No. 11,093,623, which is a continuation of application No. 15/704,735, filed on Sep. 14, 2017, now Pat. No. 10,482,266, which is a continuation of application No. 14/689,668, filed on Apr. 17, 2015, now Pat. No. 9,792,451, which is a continuation-in-part of application No. 13/710,366, filed on Dec. 10, 2012, now abandoned.

(60) Provisional application No. 63/052,851, filed on Jul. 16, 2020, provisional application No. 61/980,617, filed on Apr. 17, 2014, provisional application No. 61/569,162, filed on Dec. 9, 2011.

(52) U.S. Cl.
CPC ............ *H04L 63/20* (2013.01); *H04W 4/185* (2013.01); *G06F 2221/2107* (2013.01); *G06F 2221/2141* (2013.01); *H04L 63/0428* (2013.01)

(58) Field of Classification Search
CPC ............ G06F 21/1015; G06F 21/1012; H04L 63/104; H04L 63/20; H04L 63/0428; H04L 63/08; H04L 63/108; H04W 4/185
See application file for complete search history.

(56) References Cited

U.S. PATENT DOCUMENTS 5,475,819 A 12/1995 Miller et al.
5,557,518 A 9/1996 Rosen
5,610,980 A 3/1997 Johnson et al.
5,671,279 A 9/1997 Elgamal
5,677,955 A 10/1997 Doggett et al.
5,680,452 A 10/1997 Shanton
5,715,314 A 2/1998 Payne et al.
5,724,424 A 3/1998 Gifford
5,729,594 A 3/1998 Klingman
5,732,400 A 3/1998 Mandler et al.
5,737,414 A 4/1998 Walker et al.
5,765,144 A 6/1998 Larche et al.
5,768,382 A 6/1998 Schneier et al.
5,779,549 A 7/1998 Walker et al.
5,790,677 A 8/1998 Fox et al.
5,794,207 A 8/1998 Walker et al.
5,797,127 A 8/1998 Walker et al.
5,798,508 A 8/1998 Walker et al.
5,799,285 A 8/1998 Klingman
5,818,933 A 10/1998 Kambe et al.
5,822,737 A 10/1998 Ogram
5,855,008 A 12/1998 Goldhaber et al.
5,864,610 A 1/1999 Ronen
5,870,473 A 2/1999 Boesch et al.
5,878,403 A 3/1999 DeFrancesco et al.
5,883,810 A 3/1999 Franklin et al.
5,883,955 A 3/1999 Ronning
5,890,137 A 3/1999 Koreeda
5,892,900 A 4/1999 Ginter et al.
5,899,980 A 5/1999 Wilf et al.
5,901,228 A 5/1999 Crawford
5,903,721 A 5/1999 Sixtus
5,903,882 A 5/1999 Asay et al.
5,905,736 A 5/1999 Ronen et al.
5,909,492 A 6/1999 Payne et al.
5,909,671 A 6/1999 Byford et al.
5,914,472 A 6/1999 Foladare et al.
5,930,776 A 7/1999 Dykstra et al.
5,933,625 A 8/1999 Sugiyama
5,950,172 A 9/1999 Klingman
5,963,625 A 10/1999 Kawecki et al.
5,978,775 A 11/1999 Chen
5,991,738 A 11/1999 Ogram
5,996,076 A 11/1999 Rowney et al.
6,000,832 A 12/1999 Franklin et al.
6,002,767 A 12/1999 Kramer
6,003,765 A 12/1999 Okamoto
6,023,499 A 2/2000 Mansey et al.
6,047,268 A 4/2000 Bartoli et al.
6,058,250 A 5/2000 Harwood et al.
6,058,258 A 5/2000 Cullum et al.
6,064,987 A 5/2000 Walker et al.
6,076,078 A 6/2000 Camp et al.
6,088,686 A 7/2000 Walker et al.
6,092,147 A 7/2000 Levy et al.
6,098,053 A 8/2000 Slater
6,112,983 A 9/2000 D'Anniballe et al.
6,113,495 A 9/2000 Walker et al.
6,119,105 A 9/2000 Williams
6,138,107 A 10/2000 Elgamal
6,158,657 A 12/2000 Hall, III et al.
6,161,133 A 12/2000 Kikinis
6,173,269 B1 1/2001 Solokl et al.
6,178,240 B1 1/2001 Walker et al.
6,209,091 B1 3/2001 Sudia et al.
6,233,341 B1 5/2001 Riggins
6,236,981 B1 5/2001 Hill
6,247,047 B1 6/2001 Wolff
6,249,865 B1 6/2001 Walker et al.
6,259,789 B1 7/2001 Paone
6,263,447 B1 7/2001 French et al.
6,282,658 B2 8/2001 French et al.
6,317,729 B1 11/2001 Camp et al.
6,321,339 B1 11/2001 French et al.
6,324,524 B1 11/2001 Lent et al.
6,327,578 B1 12/2001 Linehan
6,332,134 B1 12/2001 Foster
6,341,349 B1 1/2002 Takaragi et al.
6,373,950 B1 4/2002 Rowney
6,418,169 B1 7/2002 Datari
6,438,691 B1 8/2002 Mao
6,442,607 B1 8/2002 Korn et al.
6,446,052 B1 9/2002 Juels
6,460,076 B1 10/2002 Srinivasan
6,466,917 B1 10/2002 Goyal et al.
6,484,182 B1 11/2002 Dunphy et al.
6,490,567 B1 12/2002 Gregory
6,493,685 B1 12/2002 Ensel et al.
6,570,870 B1 5/2003 Berstis
6,581,060 B1 6/2003 Choy
6,584,309 B1 6/2003 Whigham
6,594,692 B1 7/2003 Reisman
6,622,169 B2 9/2003 Kikinis
6,629,150 B1 9/2003 Huded
6,650,633 B1 11/2003 Albers et al.
6,675,153 B1 1/2004 Cook et al.
6,721,716 B1 4/2004 Gross
6,763,464 B2 7/2004 Wang et al.
6,769,009 B1 7/2004 Reisman
6,771,317 B2 8/2004 Ellis et al.
6,792,537 B1 9/2004 Liu et al.
6,823,318 B1 11/2004 Creswell et al.
6,889,205 B1 5/2005 Lamm
6,957,334 B1 10/2005 Goldstein et al.
6,959,382 B1 10/2005 Kinnis et al.
6,961,858 B2 11/2005 Fransdonk
6,973,622 B1 12/2005 Rappaport et al.
6,978,366 B1 12/2005 Ignatchenko et al.
6,993,572 B2 1/2006 Ross, Jr. et al.
7,020,635 B2 3/2006 Hamilton et al.
7,024,395 B1 4/2006 McCown et al.
7,035,824 B2 4/2006 Nel
7,039,688 B2 5/2006 Matsuda et al.
7,039,806 B1 5/2006 Friedman et al.
7,051,067 B1 5/2006 Liu et al.
7,051,072 B2 5/2006 Stewart et al.
7,072,856 B1 7/2006 Nachom
7,076,458 B2 7/2006 Lawlor et al.
7,080,049 B2 7/2006 Truitt et al.
7,080,051 B1 7/2006 Crawford
7,090,128 B2 8/2006 Farley et al.
7,103,910 B1 9/2006 Liu et al.
7,107,462 B2 9/2006 Fransdonk

(56) References Cited

U.S. PATENT DOCUMENTS 7,110,978 B1 9/2006 Chin
7,134,131 B1 11/2006 Hendricks et al.
7,143,147 B1 11/2006 Hickman et al.
7,143,148 B1 11/2006 Hickman et al.
7,143,186 B2 11/2006 Stewart et al.
7,150,045 B2 12/2006 Koelle et al.
7,206,748 B1 4/2007 Gruse et al.
7,248,675 B2 7/2007 Mirashrafi et al.
7,249,097 B2 7/2007 Hutchison et al.
7,266,499 B2 9/2007 Surace et al.
7,340,045 B2 3/2008 Felger
7,356,503 B1 4/2008 Johnson et al.
7,380,120 B1 5/2008 Garcia
7,386,477 B2 6/2008 Fano
7,451,103 B1 11/2008 Boyle et al.
7,483,858 B2 1/2009 Foran et al.
7,545,931 B2 * 6/2009 Dillaway .............. H04L 9/0894 380/44
7,546,637 B1 6/2009 Agbabian et al.
7,587,502 B2 9/2009 Crawford et al.
7,606,760 B2 10/2009 Hutchison et al.
7,620,565 B2 11/2009 Abelow
7,672,892 B2 3/2010 Odom et al.
7,681,046 B1 3/2010 Morgan et al.
7,703,140 B2 4/2010 Nath et al.
7,711,586 B2 5/2010 Aggarwal et al.
7,765,151 B1 7/2010 Williams et al.
7,818,399 B1 10/2010 Ross, Jr. et al.
7,908,226 B2 3/2011 Hutchison et al.
7,917,130 B1 3/2011 Christensen et al.
7,921,288 B1 4/2011 Hildebrand
8,001,039 B2 8/2011 Crosthwaite et al.
8,078,527 B2 12/2011 Cerise et al.
8,127,345 B2 2/2012 Gregg et al.
8,130,768 B1 3/2012 Ahrens et al.
8,738,531 B1 * 5/2014 Kalyadin ............ G06F 21/6218 705/50
8,984,640 B1 3/2015 Emigh et al.
9,058,504 B1 * 6/2015 Swanson ................. G06F 21/52
9,313,187 B1 4/2016 Huntwork et al.
9,330,275 B1 * 5/2016 Endresen ............ G06F 21/6218
9,338,092 B1 * 5/2016 Allen .................... G06F 21/606
9,602,538 B1 3/2017 Chou
9,635,000 B1 4/2017 Muftic
9,690,968 B2 6/2017 Wadley
9,792,451 B2 * 10/2017 Smith ..................... H04L 63/20
9,792,593 B2 10/2017 Hayhow et al.
10,069,914 B1 9/2018 Smith
10,078,754 B1 * 9/2018 Brandwine ............. G06F 21/78
10,482,266 B2 * 11/2019 Smith ................... H04L 63/104
10,581,737 B1 * 3/2020 Allen ...................... H04L 45/74
10,616,255 B1 4/2020 Strauss et al.
11,093,623 B2 * 8/2021 Smith ................... H04L 63/104
12,072,989 B2 * 8/2024 Smith ................... H04W 4/185
2001/0000535 A1 4/2001 Lapsley et al.
2001/0001877 A1 5/2001 French et al.
2001/0007098 A1 7/2001 Hinrichs et al.
2001/0018739 A1 8/2001 Anderson et al.
2001/0037310 A1 11/2001 Saeki
2001/0039533 A1 11/2001 Pare et al.
2001/0039535 A1 11/2001 Tsiounis et al.
2001/0042051 A1 11/2001 Barrett et al.
2001/0042124 A1 * 11/2001 Barron .................. G06F 21/606 709/227
2002/0007343 A1 1/2002 Oyama et al.
2002/0013765 A1 1/2002 Shwartz
2002/0023051 A1 2/2002 Kunzle et al.
2002/0032873 A1 3/2002 Lordemann et al.
2002/0035533 A1 3/2002 Mache et al.
2002/0046188 A1 4/2002 Burges et al.
2002/0059430 A1 5/2002 Orbke et al.
2002/0062249 A1 5/2002 Iannacci
2002/0064283 A1 5/2002 Parenty
2002/0071556 A1 6/2002 Moskowitz et al.
2002/0071564 A1 6/2002 Kurn et al.
2002/0078344 A1 6/2002 Sandhu et al.
2002/0111919 A1 8/2002 Weller et al.
2002/0116341 A1 8/2002 Hogan et al.
2002/0128969 A1 9/2002 Parmelee et al.
2002/0138722 A1 9/2002 Douceur et al.
2002/0141593 A1 10/2002 Kurn et al.
2002/0144120 A1 10/2002 Ramanathan
2002/0144262 A1 10/2002 Plotnick et al.
2002/0147838 A1 * 10/2002 Pisarsky ................. H04L 63/08 709/237
2002/0161719 A1 10/2002 Manning et al.
2002/0194209 A1 12/2002 Bolosky et al.
2002/0194484 A1 12/2002 Bolosky et al.
2003/0014362 A1 1/2003 Yim
2003/0033259 A1 2/2003 Walker et al.
2003/0046223 A1 3/2003 Crawford et al.
2003/0046237 A1 3/2003 Uberti
2003/0051172 A1 3/2003 Lordemann et al.
2003/0101341 A1 5/2003 Kettler et al.
2003/0105859 A1 6/2003 Garnett et al.
2003/0120928 A1 6/2003 Cato et al.
2003/0163423 A1 8/2003 Holst-Roness
2003/0171992 A1 9/2003 Blagg et al.
2003/0204718 A1 10/2003 Connelly et al.
2003/0236999 A1 12/2003 Brustoloni
2003/0237005 A1 12/2003 Bar-Or et al.
2004/0002878 A1 1/2004 Maria Hinton
2004/0003259 A1 1/2004 Chang
2004/0028227 A1 2/2004 Yu
2004/0078394 A1 4/2004 Powell et al.
2004/0083184 A1 4/2004 Tsuei et al.
2004/0121723 A1 6/2004 Poltorak
2004/0123112 A1 6/2004 Himmel et al.
2004/0141616 A1 7/2004 Himmel et al.
2004/0176070 A1 * 9/2004 Lai ........................ G06F 21/606 455/445
2004/0192306 A1 9/2004 Elkarat et al.
2004/0199456 A1 10/2004 Flint et al.
2004/0199782 A1 10/2004 Arnold
2004/0252836 A1 12/2004 Yoshida et al.
2004/0267665 A1 12/2004 Nam et al.
2005/0039034 A1 2/2005 Doyle et al.
2005/0060539 A1 3/2005 Anspach
2005/0094640 A1 5/2005 Howe
2005/0160281 A1 7/2005 Thibadeau
2005/0177518 A1 8/2005 Brown
2005/0192896 A1 9/2005 Hutchison et al.
2005/0216421 A1 9/2005 Barry et al.
2005/0257069 A1 11/2005 Tanaka et al.
2006/0041748 A1 2/2006 Lockhart et al.
2006/0089912 A1 4/2006 Spagna et al.
2006/0149913 A1 7/2006 Rothman et al.
2006/0168663 A1 7/2006 Viljoen et al.
2006/0224742 A1 * 10/2006 Shahbazi ................ H04L 63/20 709/226
2006/0230282 A1 10/2006 Hausler
2006/0237528 A1 10/2006 Bishop et al.
2006/0248330 A1 * 11/2006 Randle .................. H04L 63/166 713/155
2006/0277594 A1 12/2006 Chiavegatto et al.
2006/0280297 A1 12/2006 Fukaya
2006/0282681 A1 12/2006 Scheidt et al.
2007/0052517 A1 3/2007 Bishop et al.
2007/0081666 A1 4/2007 Shima
2007/0195959 A1 8/2007 Clarke
2007/0204350 A1 8/2007 Juszkiewicz
2007/0220062 A1 9/2007 Carberry et al.
2007/0226809 A1 9/2007 Ellard
2007/0250930 A1 10/2007 Aziz et al.
2007/0271578 A1 11/2007 Thenthiruperai et al.
2007/0299684 A1 12/2007 Goodwin
2007/0299771 A1 12/2007 Brody et al.
2008/0109369 A1 5/2008 Su et al.
2008/0109868 A1 5/2008 Waris
2008/0109876 A1 5/2008 Hitomi et al.
2008/0155652 A1 6/2008 DeBie
2008/0184336 A1 7/2008 Sarukkai et al.
2008/0215897 A1 9/2008 Doyle et al.
2008/0301078 A1 12/2008 Proctor et al.

(56) References Cited

U.S. PATENT DOCUMENTS

2009/0063382 A1 3/2009 Proctor et al.
2009/0070533 A1 3/2009 Elazary et al.
2009/0077618 A1 3/2009 Pearce et al.
2009/0132819 A1 5/2009 Lu et al.
2009/0210697 A1 8/2009 Chen et al.
2009/0249462 A1* 10/2009 Chhabra ............. G06F 9/44526 726/8
2009/0265610 A1 10/2009 Leonard et al.
2009/0287837 A1 11/2009 Felsher
2010/0042542 A1 2/2010 Rose et al.
2010/0067686 A1 3/2010 Minematsu
2010/0082991 A1 4/2010 Baldwin et al.
2010/0088237 A1 4/2010 Wankmueller
2010/0100972 A1 4/2010 Lemieux et al.
2010/0107220 A1 4/2010 Nguyen
2010/0138910 A1 6/2010 Aldor et al.
2010/0174652 A1 7/2010 Shear et al.
2010/0205431 A1 8/2010 Griffin
2010/0223186 A1 9/2010 Hogan et al.
2010/0228668 A1 9/2010 Hogan et al.
2010/0242083 A1 9/2010 Begum et al.
2010/0280954 A1 11/2010 Khandelwal et al.
2010/0299362 A1 11/2010 Osmond
2010/0306610 A1 12/2010 Komatsu
2010/0306842 A1* 12/2010 Asano ................... H04L 63/105 726/19
2011/0040967 A1 2/2011 Waller et al.
2011/0055920 A1* 3/2011 Hariri ................... G06F 21/552 726/22
2011/0087526 A1 4/2011 Morgenstern et al.
2011/0107418 A1 5/2011 Bhagwan et al.
2011/0162040 A1 6/2011 Stephens
2011/0252480 A1 10/2011 Patawaran et al.
2011/0293096 A1 12/2011 Reilly et al.
2011/0314271 A1 12/2011 Boccon-Gibod et al.
2012/0030421 A1 2/2012 Chang et al.
2012/0142403 A1 6/2012 Prather et al.
2012/0151553 A1* 6/2012 Burgess .............. G06F 21/6218 726/1
2012/0173431 A1 7/2012 Ritchie et al.
2012/0197806 A1 8/2012 Hill
2012/0324094 A1* 12/2012 Wyatt ..................... H04W 4/60 709/224
2013/0103584 A1 4/2013 Eichner et al.
2013/0142328 A1 6/2013 Shibata et al.
2013/0152160 A1 6/2013 Smith et al.
2014/0026191 A1 1/2014 Jain et al.
2014/0090011 A1 3/2014 Howe
2014/0150060 A1* 5/2014 Riley .................. H04L 63/0428 726/26
2014/0157041 A1* 6/2014 Danielsson ......... G06F 11/2043 714/4.2
2014/0201057 A1 7/2014 Shuster
2014/0245372 A1* 8/2014 Elias ................... G06F 21/6218 726/1
2014/0258109 A1 9/2014 Jiang et al.
2015/0006392 A1 1/2015 Brand et al.
2015/0040180 A1* 2/2015 Jacobson ................ G06F 21/62 726/1
2015/0081567 A1 3/2015 Boyle et al.
2015/0089620 A1* 3/2015 Manza .................... H04L 63/10 726/8
2015/0121506 A1* 4/2015 Cavanaugh ......... G06F 21/6218 726/16
2015/0242825 A1 8/2015 Mills
2015/0288517 A1* 10/2015 Evans ................... H04L 9/0852 713/168
2015/0294109 A1* 10/2015 Kanzaki .................. G06F 21/46 726/18
2015/0379259 A1* 12/2015 Mohammed ............ H04L 63/08 726/6
2016/0012240 A1* 1/2016 Smith ..................... H04L 63/20 726/1
2016/0021224 A1 1/2016 Howe
2016/0173510 A1* 6/2016 Harris ..................... H04L 63/20 726/23
2016/0267477 A1 9/2016 McDonald
2017/0063816 A1* 3/2017 Ackerly .............. H04L 63/0428
2017/0103459 A1 4/2017 Kim
2017/0132630 A1 5/2017 Castinado et al.
2017/0134765 A1 5/2017 Uhr et al.
2017/0149745 A1 5/2017 Geng
2017/0195330 A1 7/2017 Ren et al.
2018/0012000 A1* 1/2018 Ogawa ................ H04L 63/0846
2018/0097789 A1* 4/2018 Murthy ............... H04L 63/0227
2018/0139219 A1 5/2018 Sabata et al.
2018/0145957 A1* 5/2018 Kasibhatla .......... H04L 63/0846
2018/0351733 A1 12/2018 Rohel et al.
2018/0373887 A1 12/2018 Smith
2019/0058693 A1* 2/2019 Alkhabbaz .............. H04L 63/14
2019/0230090 A1* 7/2019 Kathiara ............... H04L 9/3247
2020/0134158 A1* 4/2020 Mullins ................... G06F 21/34
2020/0162252 A1* 5/2020 Davis .................... H04L 9/0872
2020/0177589 A1 6/2020 Mangalvedkar et al.
2020/0210568 A1* 7/2020 Strogov .............. G06F 21/6218
2020/0294293 A1* 9/2020 Boenig, II .............. G06T 11/60
2021/0126774 A1* 4/2021 Galligan ............. H04L 63/0435
2021/0194853 A1* 6/2021 Xiao ..................... H04L 43/028
2021/0234700 A1* 7/2021 Ali ........................ H04L 9/3226
2022/0100825 A1 3/2022 Groth et al.
2022/0329631 A1 10/2022 Chin et al.

FOREIGN PATENT DOCUMENTS

EP 0765068 A2 3/1997
EP 0 779 587 A2 6/1997
EP 0818907 A2 1/1998
EP 0883076 A2 12/1998
EP 0902381 A2 3/1999
EP 0 921 487 A2 6/1999
JP 9-91132 4/1997
JP 9-114787 5/1997
JP 9-114904 5/1997
JP 9-153964 6/1997
JP 9-179912 7/1997
JP 9-218903 8/1997
JP 9-259189 10/1997
JP 9-297789 11/1997
JP 9-305682 11/1997
JP 9-326002 12/1997
JP 10-3501 1/1998
JP 10-509543 9/1998
JP 10-327145 12/1998
JP 11-3387 1/1999
JP 11003387 1/1999
JP 11-53444 2/1999
JP 11-503541 3/1999
JP 11-239128 8/1999
JP 11-353280 12/1999
JP 2001-350664 A 12/2001
JP 2002-353953 A 12/2002
JP 2005-056418 A 3/2005
JP 2009-252120 A 10/2009
KR 1020000012391 3/2000
KR 10-2008-0064687 A 7/2008
KR 10-2008-0064787 7/2008
WO WO-95/16971 A1 6/1995
WO WO-96/21192 A1 7/1996
WO WO-96/31965 A1 10/1996
WO WO-96/37848 A1 11/1996
WO WO-97/01920 A1 1/1997
WO WO-9809260 4/1997
WO WO-97/22074 A1 6/1997
WO WO-97/29584 A1 8/1997
WO WO-97/49054 A2 12/1997
WO WO-98/40809 A2 9/1998
WO WO-98/57460 A1 12/1998

(56) References Cited

FOREIGN PATENT DOCUMENTS

| | | | |
|---|---|---|---|
| WO | WO-99/21321 | A1 | 4/1999 |
| WO | WO-99/57835 | A1 | 11/1999 |

OTHER PUBLICATIONS

Alsop, S., "Bookmarks Mark the Next Chapter in the Continuing Story of the War of the Web," Info World 17(37):102, Sep. 11, 1995.
Benji Rogers: "How the Blockchain and VR Can Change the Music Industry—Cuepoint—Medium", Nov. 23, 2015 (Nov. 23, 2015), XP055374610, Retrieved from the Internet <URL:https://medium.com/cuepoint/bc-a-fair-trade-music-format-virtual-reality-the-blockchain-76fc47699733>.
Briefly Noted, Internet Business News, © 1994-8 M2 Communications Ltd., Coventry, United Kingdom, Jan. 1, 1998, p. 1.
Davenport, G, "New eCharge Internet Billing System Charges Purchases to Telephone Bill with AT&T MultiQuest", Business Wire, Dec. 3, 1997, 2 pages.
Decision of Rejection mailed Dec. 6, 2011, issued in Japanese Patent Application No. 2001-587188, filed May 25, 2001, 8 pages.
DigiBox: A Self-Protecting Container for Information Commerce, Olin Sibert, et al. 1995.
Electronic Commerce News, vol. 3, No. 42, Oct. 19, 1998, "Plastic or Cybercash? Cutting Banks out of the Payment Circuit," three pages.
Encryption Devices, Government Executive, Jul. 1996, p. 2A.
http://www.echarge.att.com/, "AT&T eCharge: Simple," available at least as early as Oct. 29, 1997.
http://www.echarge.att.com/cgi-bin/Activate.cgi, "AT&T eCharge: Activate Your Account," available at least as early at Oct. 29, 1997.
http://www.echarge.att.com/cgi-bin/Register.cgi, "AT&T eCharge: Apply for an Account," available at least as early at Oct. 29, 1997.
http://www.echarge.att.com/cgi-bin/Transactions.cgi, "AT&T eCharge: Account Activity," available at least as early as Oct. 29, 1997.
http://www.echarge.att.com/faq.html, "AT&T eCharge: Frequently Asked Questions/Customer Support," available at least as early as Oct. 29, 1997.
http://www.echarge.att.com/how_wk .. html, "AT&T eCharge: How Does It Work?" available at least as early as Oct. 29, 1997.
http://www.echarge.att.com/index.html, "AT&T eCharge: Welcome to AT&T eCharge," available at least as early as Oct. 29, 1997.
http://www.echarge.att.com/index.html, "AT&T eCharge," available at least as early as Oct. 29, 1997.
http://www.echarge.att.com/terms_conditions.html, "AT&T eCharge: Frequently Asked Questions/Customer Support," available at least as early as Oct. 29, 1997.
Information Intelligence, Inc., "User Authentication and Authorization Challenges in a Networked Library Environment," Online Libraries & Microcomputers 15(10), Oct. 1, 1997.
International Preliminary Report on Patentability for International Application No. PCT/US2001/017106 dated Nov. 13, 2002.
International Preliminary Report on Patentability for International Application No. PCT/US2017/020640 dated Sep. 4, 2018.
International Search Report and Written Opinion for International Application No. PCT/US2017/020640 dated Sep. 8, 2017.
International Search Report and Written Opinion mailed Jan. 4, 2016, issued in corresponding International Application No. PCT/US2015/026405, filed Apr. 17, 2015, 6 pages.
International Search Report and Written Opinion mailed Mar. 22, 2013, issued in corresponding International Application No. PCT/US2012/068826, filed Dec. 10, 2012, 11 pages.
Internet 900 Billing Fills Void, Audiotex News, Dec. 1997, p. 5 (abstract).
Internet Service Considers 900, Audiotex News, Jan. 1997, p. 8 (abstract).
Itoh, M., et al., "Outline of SET Protocol," NEC Journal 51 (9):90-99, 1998 (with partial English translation provided by foreign associate).
Lang, P., "Product Review: eCharge Billing System" © 1997-2009 Optimum Interactive LLC, Apr. 1998, <http:/fsellitontheweb.com/ezine/echarge.shtml> [retrieved Dec. 10, 2008], 3 pages.
Lau, H., "Open House: E-business and you: Buying on the Net . . . Safely," Businessworld (Philippines), Nov. 3, 1998.
Logicom, Inc., "New Web900 Service Offers Secure Billing Over the Internet," News Release, Jul. 1, 1996.
Marion, L., "Who's Guarding the Till at the Cybermall?" Datamation 41 (3):38-39, Feb. 15, 1995.
Minkoff, J., "Ensuring Online Security," Discount Merchandiser, Jan. 1996, p. 49.
Pappalardo, D., "Tools Lets ISPs Charge for Fax, Voice," Network World, Apr. 1997, p. 116.
PR Newsire Association, Inc., "Verisign Offers Unique Seal to Show Internet Users 'Proof of Authentication'," PR Newswire, Dec. 10, 1996.
Schneier, B., "Applied Cryptography: Protocols, Algorithms, and Source Code in C," 2nd Edition, John Wiley & Sons, Inc., New York, 1996 (rather than sending the entire text, applicants refer Examiner to the remarks regarding this reference that are contained in the European Examination Report identified in No. 3 above).
Sirbu, M.A., "Creating an Open Market for Information," Journal of Academic Librarianship, Nov. 1995, p. 467 (abstract).
Sweetland. P., "Integrated Billing and the Internet, "Telecommunications 31(6):127-130, Jun. 1997.
Victims Seeking Cheap Online Erotica Aroused by Not-So-Cheap Phone Bills, San Jose Mercury News, Feb. 20, 1997, p. 1C.
Wasserman, T., "Retailers, OSPs Race to Secure Qnline Sales," Computer Retail Week 7(160):6-7, Jan. 6, 1997.
Wingfield, N., "Netscape Joins Fray with Web Browser for Windows 95," Info World 17(27):37, Jul. 3, 1995.
Yamamoto, H., "Development of Cyber Business by Integrating Internet Protocol Service with Telephone Service", The Telecommunications Association, NTT Technical Review 10(1):86-88, Jan. 1998.
Yamasaki, S., and K. Araki, "A Certificate Infrastructure Model for Integrated Cross-Authentification With Warranty and Use Policy Control," Trans. Information Processing Society of Japan 40(1 ):296-309, Jan. 1999 (English Abstract).

* cited by examiner

FIG. 8

SYSTEM AND METHODS FOR USING CIPHER OBJECTS TO PROTECT DATA

This application is a continuation of U.S. application Ser. No. 17/377,595, filed on Jul. 16, 2021, which is continuation-in-part of U.S. application Ser. No. 16/657,412, filed on Oct. 18, 2019, now 11,093,623, which is a continuation of U.S. application Ser. No. 15/704,735, filed on Sep. 14, 2017, now U.S. Pat. No. 10,482,266, which is a continuation of U.S. application Ser. No. 14/689,668, filed on Apr. 17, 2015, now U.S. Pat. No. 9,792,451, which claims priority to U.S. Provisional Application No. 61/980,617, filed Apr. 17, 2014, and is a continuation-in-part application of U.S. application Ser. No. 13/710,366, filed Dec. 10, 2012, which claims priority to U.S. Provisional Application No. 61/569,162, filed Dec. 9, 2011, and is entitled to those filing dates for priority in whole or in part. This application also claims priority to and the benefit of U.S. Provisional Application No. 63/052,851. The specifications, figures and complete disclosures of the aforementioned applications are incorporated herein by specific reference for all purposes.

FIELD OF THE INVENTION

This invention relates to a system and related methods for protecting and controlling data using self-encryption, self-governance, self-protection and delegation, including, but not limited to, the use of an intelligent cipher transfer object having flexible access protocols.

BACKGROUND OF THE INVENTION

Current techniques for protecting the secure transfer of data have certain drawbacks. When information is outside of a trusted environment, like a secure network, it is typically protected by encryption in large part, because application-level security measures no longer have control of the information. Current techniques use encryption keys which must be present within an application, or revealed or exchanged among users or via an application, for encrypted data to be useful, thereby potentially compromising protection and confidentiality. For example, encryption keys can be stolen in a discovery or APT assault, or can be compromised via social engineering or other means. Further, once an encryption key (or password) is shared and the data unlocked, control of the data is lost. Even when data is within a trusted environment, such as behind a firewall or the like, it is vulnerable to attack or misuse, as files are available to anyone with access to their storage location. Protecting information traditionally requires teams of people with expertise in networks, consumer devices (especially in a bring-your-own-device environment), telecommunication, servers and applications, and integrating and coordinating the expertise and efforts on an enterprise scale to achieve a level of security which nevertheless can be compromised by exploiting flaws and gaps inherent in complex integrations.

Conventional data encryption uses algorithms that run in a predetermined sequence to encrypt and then, typically, run in the reverse sequence to decrypt the data. There may also be a process of moving pieces of data in a static pattern to cloak it, and then reversing the process to reveal the complete, unencrypted file. With this method, an attacker who has access to the encryption algorithm used to encrypt data can break the encryption by reversing the encryption process.

Another traditional technique for protecting data is the use of dynamic controls. Dynamic controls are application dependent, such as password protected PDF files generated and used by document viewing and editing software produced by Adobe®, or the like. Traditional dynamic controls are dependent on the application or reside within an application. Rules are executed by the application. While also dependent on a key (password) exchange as described above, another drawback to this method is that application-dependent rules may be overridden (as in the example of a protected PDF opened with Adobe® Acrobat®) or, a developer could write an application that ignores the rules imposed by the authoring application.

Accordingly, what is needed is a data assurance solution that is self-protecting and self-governing, that is less dependent on keys and passwords for authentication, on predictable reversible encryption sequences for protection, or on external applications for execution while remaining functional and efficient both within and outside the secure environment, both for data at rest and in transit.

SUMMARY OF THE INVENTION

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In various embodiments, aspects of the invention provide methods and supporting systems for authenticating users of self-protecting data objects ("SPDOs") through the use of a pseudo user object, (referred to herein as a "Delegate") to resolve user authentication in a dynamic user environment in which a static built-in framework used in many SPDOs is no longer viable. The technique uses a combination of static user list, a dynamic user list supported through a Delegate service, a gateway to access existing enterprise LDAP/AD services, and a local cached user credential that can also include a time-to-live and domain recognition for additional security. This combination provides a complete and flexible solution to user authentication of SPDOs, and can securely provide user authentication in variety of scenarios.

Therefore, in a first aspect, the invention provides

BRIEF DESCRIPTION OF THE DRAWINGS

The foregoing aspects and many of the attendant advantages of embodiments of the present disclosure will become more readily appreciated as the same become better understood by reference to the following detailed description, when taken in conjunction with the accompanying drawings.

FIG. 8 shows a flow chart that illustrates a exemplary embodiment of creating an ICTO according to another exemplary embodiment of the present invention.

DETAILED DESCRIPTION OF EXEMPLARY EMBODIMENTS

Figure 1:
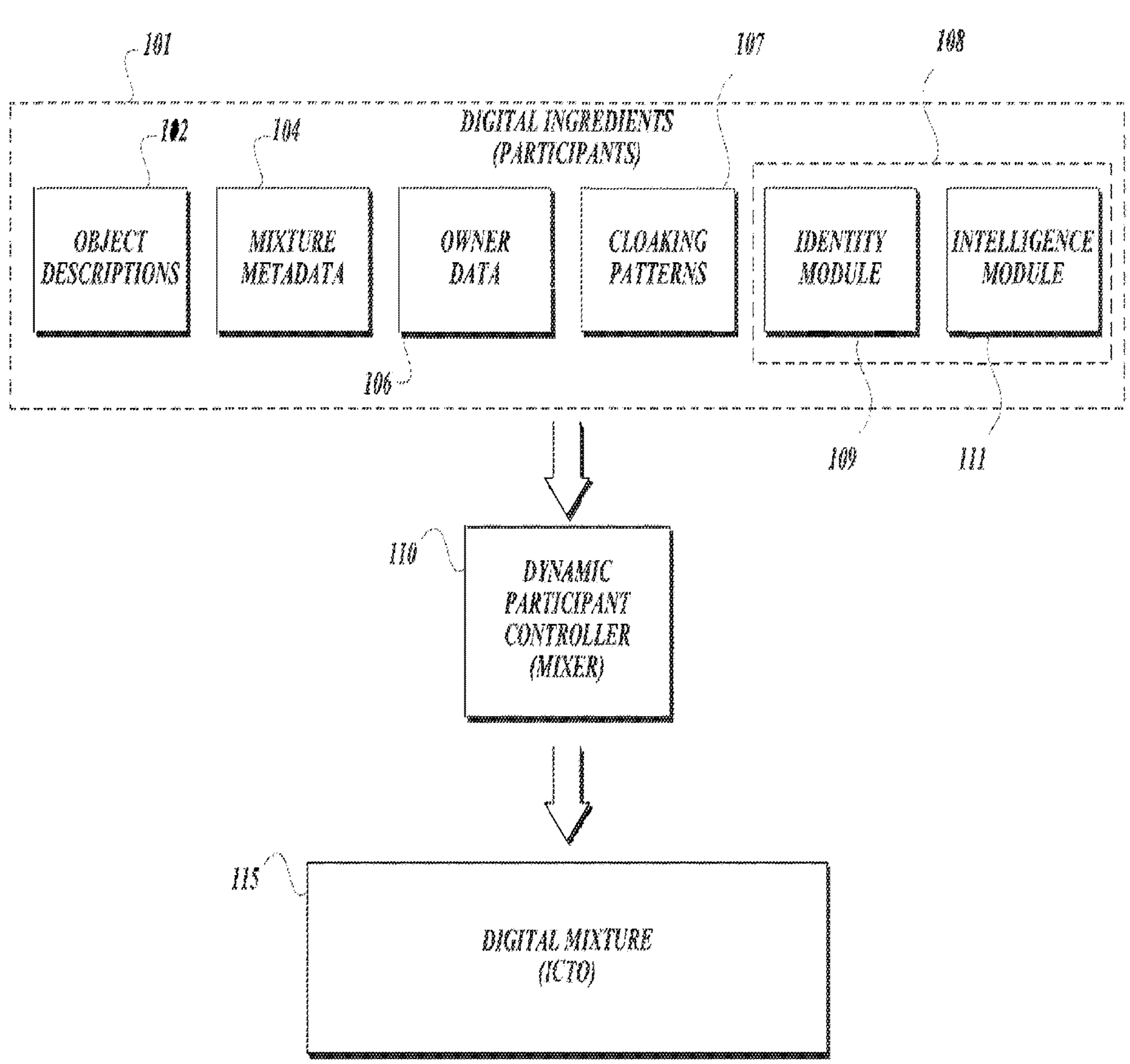
FIG. 1 shows a schematic diagram that illustrates an exemplary embodiment of data governance according to various aspects of the present invention.

In several exemplary embodiments, the present invention comprises a self-contained, self-protecting, self-controlling intelligent cipher transfer object (ICTO), which may be stored on a computer-readable medium. The ICTO comprises a set of participants including a portable dynamic rule set (PDRS). Computer-implemented methods of creating, accessing, and using such an ICTO, and a computing device configured to execute the executable portions of such an ICTO, also are provided.

In various embodiments, the present invention addresses critical faults with previous data protection systems and methods. The present invention fills a gap in existing protection schemes because existing schemes address perimeter defenses, user access (both users and their devices) and anomaly detection, but are not attached to the data itself. If prior-art encryption is utilized, the burden of key code management may reduce productivity or flaws may create yet other vulnerabilities by exposing keys that likewise need to be protected.

Embodiments of the present disclosure provide a self-contained, self-protecting, self-governing, data-centric solution, meaning that the controls for data management, protection, and administration are grafted into, and become part of, each data set and directly oversee the data set's access and use. Though, in some embodiments of the present disclosure, some data can be removed from protection for analysis or use by an authorized agent, the, method of removal from protection is not predictable, because it is not a reversal of the protection mechanism or mechanisms. The present invention comprises an unpredictable and irreversible system and associated methods to retain dynamic, portable, independent, persistent, intelligent governance of data over the life of the data's existence. This system is capable of protecting data while the data is stored or in transit, and in the hands of trusted data users or untrusted data users.

In some embodiments of the present disclosure, the data protection scheme is embedded within, grafted to, and maintained within the data-set and thus form a self-protecting data object, or SPDO. The data protection scheme may also create an audit trail of attempts to access the data. Known or authorized users of the data are noted in an embedded log, while unknown parties or other unauthorized attempts to access the data are likewise noted in the embedded log and can be transmitted and displayed to the data owner in real time. If an unauthorized party attempts to access the data, the self-protecting data can defend itself, take offensive action against the intrusion, alert the data owner to the unauthorized attempt, and/or take any other appropriate action.

The data owner utilizes the protection scheme as a simple and lightweight management tool that continuously validates the relationship of the parties to the data. From an attacker's point of view, the system is unpredictable because every authorized party has its established identity incorporated into the protection scheme. A unique protection scheme may be provided for each combination of owner, user, and dataset; this means that the method by which data is revealed to Authorized Party A would not be the way data is revealed to Authorized Party B.

Further, the unique protection scheme that may be provided for a combination of owner, user, data set and rule set will likewise be unique to itself when the same combination is protected subsequent times. That is, each time a combination of owner, user, data set and rule set is protected as described herein, whether it is the same combination or a different combination, the ICTO will be a uniquely protected ICTO.

In some embodiments, different techniques may be used to protect the data and to access the protected data. For example, an irreversible protection scheme may be used to combine multiple pieces of data into a single digital mixture, such that a selective retrieval scheme may be used to selectively retrieve pieces of data from the single digital mixture without obtaining access to other protected data in the digital mixture. In such an embodiment, when the data is properly accessed, it is selectively revealed, based upon the owner's wishes for the authorized recipient. The path to reveal information is not a function of retracing the original steps, and the original protection scheme used to combine the multiple pieces of data may not be reversible other than with respect to individually requested pieces of data. In other words, even though pieces of data stored by the protection scheme may be accessed, the totality of the digital mixture is not accessible in such a way that allows the totality of the original contents to be reconstituted. Embodiments of the, present disclosure are configured to positively identify any user or entity identity such that is included as a participant as legitimate or not, and the data owner controls which portions or pieces of data to which the identified legitimate users can gain access. Unauthorized parties, whether inside or external to the intended recipient or the intended recipient's network, can never access the data in its unprotected form. Embodiments of the present disclosure unequivocally confirm the identity of a trusted party before providing access to ensure data security. Reversing or reverse engineering the protection scheme cannot yield the original results.

In several embodiments of the present invention, rules are executed by an executable portion of the digital mixture, ensuring the absolute wishes of the data owner are enforced without relying on a third party or an outside entity or application or operating system. The protection scheme is not dependent on an application or an operating system to protect/unprotect the data: the data is self-protecting and self-controlling. The protection scheme is independent of operating system, environment, and application (i.e., external or centralized or server key management, password management and identity management applications).

Methods in the protocol are implemented in executable code stored in the data mixture, and are executed in response to detecting a request by the user to access the data through a structured API. Furthermore, the data can be of any type (e.g., text, audio, video, or combination thereof), and in any kind of container, database or environment: (e.g., buffer, directory, file, or combinations thereof). Any attempt to access the data, other than through the API or other means described herein will be foiled by the applied cloaking patterns, which will be undeterminable by any component outside of or other than the components implementing the API. When attempting to access the data through the API or other means described herein, the protection scheme ensures that legitimate users are only able to access data as permitted by the data owner.

Other methods initiated through the API, or other ICTO-aware application, device or operating system, initially validate the ICTO. Subsequently, the outer cloaking technology locates the executable code, cipher engine, or mixer stored in the digital mixture. A request for access is received by the executable code via the API or other ICTO-aware application, device or operating system on behalf of the agent. The executable code is energized, or "awakened," at which point the portable dynamic rule set takes and maintains control until the self-governed data object is closed or becomes inactive. Any attempt to access the self-protecting, self-controlling digital mixture without energizing the executable code will be unsuccessful.

FIG. 1 is a schematic diagram that illustrates an exemplary embodiment of self-governing data according to various aspects of the present invention. A dynamic participant controller 110, or "mixer," identifies a set of digital ingredients ("participants") 101, including descriptions of authorized agents, device locations, rules for using the data, and/or other ingredients as discussed further below. By mixing these ingredients, the mixer 110 forms a cloaked entity, the intelligent cipher transfer object, or ICTO 115. The ICTO 115 may also be called a "digital mixture." As discussed herein, one of ordinary skill in the art will recognize that the terms "ICTO" and "digital mixture" and "self-governing data" may be, used interchangeably. To an unauthorized entity or third party viewing the ICTO 115 directly, the ICTO 115 may simply appear to be a set of data. The ICTO 115 appears to the outside as a homogenous mixture without resembling or exposing the original ingredients. However, when accessed via an application implementing the API (such as the mixer 110, an ICTO-aware client application (not illustrated), and/or the like), executable portions of the ICTO 115 are accessible to provide access to the data governed by the ICTO 115.

In some embodiments, the executable portions of the ICTO 115 may be stored at a determinable location within the ICTO 115 to allow an application implementing the API to easily find the executable portions. In some embodiments, additional protection may be applied to the ICTO 115 by storing one or more executable portions of the ICTO 115 at variable locations within the ICTO 115. While these variable locations make the executable portions of the ICTO 115 exceedingly difficult for an unauthorized user to find, an ICTO-aware application implementing the API for accessing the ICTO 115 may be able to compute the variable locations for a given ICTO 115 based on a feature of the ICTO 115. For example, the secure application may read an attribute of the ICTO 115 such as a file size, a creation time, and/or the like, and may perform a calculation that determines the location using the attribute as a seed. By keeping the details of the calculation secret, the location of the executable portions of the ICTO 115 can likewise be kept secret.

The set of participants 101 may include object descriptions 102, mixture metadata 104, owner data 106, cloaking patterns 107, an identity module 109, and an intelligence module 111. in some embodiments, a combination of the identity module 109 and the intelligence module 111 may be considered together as a portable dynamic rule set 108. The object descriptions 102 may include owner-supplied and owner-defined earmarks, data identifiers, and/or properties. Owner data 106 may include data that is to be protected within the ICTO 115, such as a document, a file, a buffer, a directory, a pointer to remotely stored data, database, and/or the like. In some embodiments, owner data 106 may be optional, if the ICTO 115 is merely used, for example, for a signature verification method that is not associated with underlying signed data. In some embodiments, multiple pieces of owner data 106 may be included within a single ICTO 115. In some embodiments, owner data 106 from multiple owners may be included within a single ICTO 115.

The cloaking patterns 107 specify various combinations of data protection and access techniques supported by the mixer 110. The data protection and access techniques included in cloaking patterns 107 may include techniques such as industry standard verified encryption, compression, randomization, normalization, and/or other techniques. Techniques suitable for use as cloaking patterns 107 are not limited to currently known techniques, but could include any privately or publicly available encoding and/or decoding technique, known now or developed in the future. Use of a cloaking pattern 107 to protect and/or access data may involve applying the combination of data protection and/or access techniques specified in the cloaking pattern 107 to the data.

The mixture metadata 104 provides organizational information for the digital mixture 115, such as virtual file system data containing directories, key codes, user files, signatures, and/or the like.

The identity module 109 may include dynamic identity attributes that uniquely identify protected agents in a transaction. In some embodiments, the. identity module 109 may include data that represents a configuration of a computing device that may be given certain rights with respect to a protected object. The identity module 109 may contain specific information about hardware or software configurations installed on the computing device usable to identify the computing device. The identity module 109 may contain data including, but not limited to, CPU information including model numbers, number of cores, speed, and/or the like; a chassis serial number; manufacturer data; a volatile memory size; a non-volatile memory size; one or more storage device serial numbers and/or model numbers; installed software titles and/or version numbers, and/or the like.

In some, embodiments, a transaction is an atomic action using the ICTO 115 in which one or more agents securely exchange data within a given context and with a specified intent. Authorized agents may include human and non-human entities, such as a human user, a unique mechanical object, a unique electronic object, a unique software or program object, and/or the like. Dynamic identity attributes contained in the ICTO 115 may be modified by the intelligence module 111 within or during the course of an interaction with the ICTO 115, and may include, application-specified identifiers, account identifiers, biometric signatures, device and/or location signatures, temporal data, cryptographic keys, and/or the like. In some embodiments, a location signature may include data from a geolocation technology, such as GPS, GSM network locating, IP address locating, dead reckoning, and/or the like. The location signature may include a longitude, latitude, an altitude, an approximate street address, and/or the, like. Additional location data such as street, city, state, country, postal code, and/or the like may also be present. In some embodiments, the temporal data may include, a timestamp and/or the like, which may allow rules or other intelligent code to enforce timers, expirations, dynamic keys, and/or the, like. The temporal data may include a simple date/time value, or may include a complex schedule comprising timestamp ranges and/or other scheduling guidelines.

In some embodiments, each ICTO 115 includes at least one digital signature key. The digital signature key may be validated using an external digital certificate available to the mixer 110. During access of the ICTO 115, the mixer 110 validates the digital signature key using the, external digital certificate and verifies that the digital signature key is valid for an agent currently accessing the ICTO 115. In some embodiments, multiple agents may sign off on the ICTO 115. In such an embodiment, the ICTO 115 may include a chain of signature keys, wherein each signature key may be associated with a separate external digital certificate for validation. For example, an ICTO 115 may be used by an owner to create a protected file for a transfer to multiple, agents wherein each agent may access different sections of the file but not the entire file, either simultaneously or sequentially. Both the, owner and the agents may have to provide valid digital sig-natures to allow the transaction to proceed.

The intelligence module 111 may include dynamic rule sets capable of recording and communicating access data and other relevant history; along with intelligent code, that provides configurable functionality for performing actions to protect the ICTO 115. Rules may be provided at object creation time. However, in some embodiments, a rule may have a capability to modify itself or other rules for a previously created ICTO 115. In some embodiments, a rule may have a capability to create additional rules. For example, a rule may determine, from identity data, that additional protection is desirable for a given ICTO 115. The rule may then create additional encryption and/or decryption rales to be applied. The rales are protected and contained within the ICTO 115. In some embodiments, the rales may only be executable by an executable portion of the intelligence module 111, and/or may be written in a proprietary language and stored in com-piled or binary form. Based on the rules and requirements of the identity module 109, the intelligence module 111 acts on its rales and requirements. Application-specified identifiers may vary from access to access, and may vary depending on a type of agent. For example, for a human user, application-specified identifiers may include account keys, transaction information, context keys, associated intents, and/or the like. For an electronic object, a digital asset, or any other potential agent, application-specified identifiers may also include an IP address, a URL, a file specification, and/or the like.

In some embodiments, the embedded portable dynamic rule set or sets have read/write access to the embedded participants 101, even while the participants 101 are protected by the ICTO 115. In other words, a rule may read and write data to the mixture metadata 104 and the owner data 106 of the ICTO 115. This may be useful for recording access information such as date, time, place, and the like, and/or to destroy the data if an attack is detected. Some examples of decisions made or actions taken by intelligent code within rales may include, but are not limited to: evaluating object content and context for validity; challenging an agent for proof of identity; interacting with client code; contacting a server for validation; causing the ICTO 115 to self-destruct; maintaining a history of object access and sending the history information to a server; allowing on-line and/or off-line object access; creating new rules based on dynamic server updates; encrypting and decrypting data; mangling and unmangling data; and/or the like.

The use of portable dynamic rules may have various benefits. For example, pre encryption and pre-decryption rales may provide dynamic salt and encryption keys based on participant-specified criteria. Such dynamic keys may be based on temporal data, environment data, or any other algorithm specified in a pre-encryption rule. As another example, rules may access encrypted identity artifacts within the ICTO 115 in order to validate the agent without exposing unprotected data to unauthorized users. As yet another example, because the, rules are portable and are therefore included within the ICTO 115, rules may be written in such a way as to allow the ICTO 115 to be fully protected from unauthorized access even when off-line or out-of-network. As a further example, rules may add nested protection, if the ICTO 115 protects a document that is meant to be, read by a single agent within one. hour of creation, a rule may implement the timer and issue a self-destruct mechanism.

As stated above, the embedded mixer 110 uses an embedded portable dynamic rule set 108 to form a mixture of the object descriptions 102, the mixture metadata 104, the owner data 106, the cloaking patterns 107, the identity module 109, and the intelligence module 111 that comprises a self-protecting, self-governing ICTO 115. In some embodiments, various components of the ICTO 115 may be marked by encoded checksums to detect tampering. For example, the entire ICTO 115, the rules, the owner data, and/or the user data may each be validated by an embedded checksum. The checksum may be a hash value generated based on the contents of the checksum target. In some embodiments, the algorithm used to generate the checksum is sensitive enough to reliably detect a change of a single bit value of even a large data-set. Some suitable algorithms include MD5 and SHA, though any other suitable algorithm may be used. Each checksum may be appended, prepended, or otherwise combined with the checksum target for storage, or may be. stored in a separate location.

Figure 7:
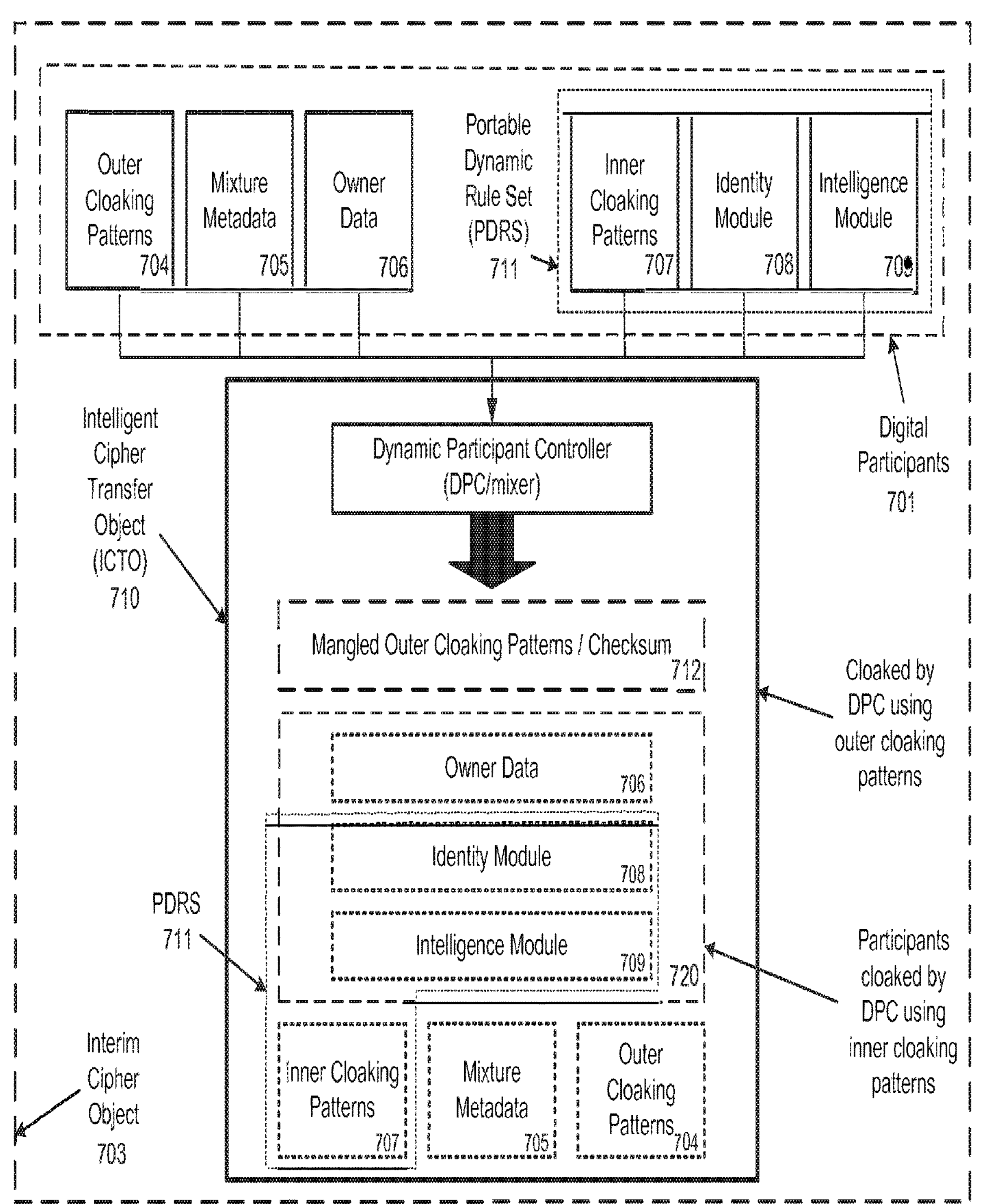
FIG. 7 shows a schematic diagram that illustrates an exemplary embodiment of data governance according to another exemplary embodiment of the present invention.

FIG. 7 is a schematic diagram that illustrates another exemplary embodiment of self-contained, self-controlling, self-governing data protection according to additional embodiments of the present invention. An API or other ICTO-aware application, device, or operating system initiates a request to the dynamic participant controller or executable mixer 702, thereby energizing it, to protect a set of digital participants 701. Digital participants include, but are not limited to, authorized agents, devices, locations, rules for using the data, and/or other digital ingredients as discussed further below, gathered for inclusion in the self-protecting, self-governing data object (i.e., digital mixture, or ICTO) 710. The dynamic participant controller 702, when energized, creates an interim cipher object 703 utilizing a temporary or "starter" rule set while said object is being constructed. The interim cipher object 703 is cloaked using one or more outer cloaking patterns 704 selected, created or produced by algorithms generated by the mixer 702.

The set of digital participants 701 may include, but are not limited to, outer cloaking patterns 704, mixture metadata 705, owner data 706, inner cloaking patterns 707, an identity module 708, and an intelligence module 709. In some embodiments, a combination of the inner cloaking patterns 707, the identity module 708 and the intelligence module 709 can be considered together as the portable dynamic rule set (PDRS) 711. Owner data 706 that is to be protected within the ICTO 710 and governed by the PDRS 711, may include a number of data types, including, but not limited to, an image, a video, a message, an email, a document, a file, a buffer, a directory, a pointer to remotely stored data, a portal, and the like. In several embodiments, owner data 706 may be optional and thus not included, such as when the ICTO 710 is merely used, for example, as an irrefutable and certain signature verification method. In some embodiments, multiple pieces of owner data may be mixed into a single ICTO 710. in other embodiments, owner data from multiple owners may be included in a single ICTO 710. In further embodiments, multiple ICTOs could be mixed into a single ICTO.

The inner cloaking patterns 707 specify various combinations of data protection and access techniques determined by the owner's rules set forth in the portable dynamic rule set 711 and supported by the dynamic participant controller or mixer 702. The data protection and access techniques included in the inner cloaking patterns 707 may include, but are not limited to, techniques such as industry standard encryption, proprietary encryption, compression, randomization, normalization, and the, like. Techniques suitable for use as inner cloaking patterns 707 are not limited to currently known techniques, but could include any privately or publicly available encoding and/or decoding techniques, known now or developed in the future. Use of an inner cloaking pattern 707 to protect and/or access data may involve applying the combination of data protection and/or access techniques specified in the portable dynamic rule set 711 to the data and other participants.

The outer cloaking patterns 704 specify various combinations of data protection and access techniques selected through one or more algorithms calculated, used, or created by the dynamic participant controller 702 utilizing the interim rule set to create the interim cipher object 703. The data protection and access techniques included in the outer cloaking patterns 704 may include, but are not limited to, techniques such as industry standard verified encryption, compression, randomization, normalization, and the like. Techniques suitable for use as outer cloaking patterns 704 are not limited to currently known techniques, but could include any privately or publicly available encoding and/or decoding technique, known now or developed in the, future. Use of an outer cloaking pattern 704 to protect and/or access data may involve applying the combination of data protection calculated by the dynamic participant controller 702 and specified by the interim rule set. The mixture metadata 705 provides organizational information for the digital mixture 710, such as, but not limited to, virtual file system data containing directories, user files, and the like.

The identity module 708 may include dynamic identity attributes that uniquely identify legitimate agents in a transaction. Dynamic identity attributes can be learned information that are added to the identity module within the PDRS such as, but not limited to, location, device, and access behavior. Learned information is collected and can be utilized in a future access request session, thereby adding additional intelligence and decision points. Additionally, dynamic identity attributes can also be volatile (i.e., unpredictable) details. They may be presented during the authentication process, alone or in conjunction with personal identity attributes, in the determination of legitimate identification of an agent requesting access to an ICTO.

In some embodiments, the identity module 708 may include data that represents a configuration of a computing device that may be given certain rights with respect to a protected object. The identity module 708 may contain specific information about hardware or software configurations installed on the computing device usable to identify the computing device. The identity module 708 may contain data including, but not limited to, CPU information including model numbers, number of cores, speed, and/or the like; a chassis serial number; manufacturer data; a volatile memory size; a nonvolatile memory size; one or more storage device serial numbers and/or model numbers; installed software titles and/or version numbers, and/or the like.

In several embodiments, a transaction is an atomic action using the ICTO 710 in which one or more legitimate and authorized agents securely exchange data or information within a given context and with a specified intent. Legitimate, authorized agents may include human and non-human entities, such as a human user, a unique mechanical object, a unique electronic object, a unique software or program object, or the like. Dynamic identity attributes contained in the ICTO 710 may be modified by the intelligence module 709 within or during the course of an interaction with the ICTO 710, and may include, but are not limited to, application-specified identifiers, account identifiers, biometric signatures, device and/or location signatures, temporal data, cryptographic keys or data, and the like. In some, embodiments, a location signature may include data from a geolocation technology, such as GPS, GSM network locating, IP address locating, dead reckoning, and the like. The location signature may include a longitude, latitude, an altitude, an approximate street address, and the like. Additional location data such as street, city, state, country, postal code, and the like may also be present. In some embodiments, the temporal data may include a timestamp or similar information, which may allow rules or other intelligent code to enforce timers, expirations, dynamic keys, and the like. The temporal data may include a simple date/time value, or may include a complex schedule comprising timestamp ranges and/or other scheduling guidelines.

In some embodiments, each ICTO 710 may include one or more digital signature requirements, human or non-human. During authentication by the ICTO 710, the portable dynamic rule set 711 determines the digital signature to be valid for a legitimate, agent requesting access to information governed by the PDRS 711. In some embodiments, multiple legitimate agents may verify the authority of other legitimate agents. In such an embodiment, the PDRS 711 may enforce a chain of digital signature requirements, wherein each digital signature, may be associated with a separate legitimate agent. For example, an ICTO 710 may be used by an owner to create a self-governing file for approvals, signature and transfer to multiple legitimate agents wherein each legitimate agent may access different sections of the file but not the entire file, either simultaneously or sequentially. Both the owner and the legitimate agents may have to provide valid digital signatures to allow the transaction to proceed.

The intelligence module 709 may include dynamic rule sets capable of recording and communicating access data and other relevant events; along with intelligent code that provides configurable functionality for performing actions to govern the ICTO 710. Rules may be provided at object creation time. However, in some embodiments, a rule may modify itself or other rules of a given ICTO 710 instance. In some embodiments, a rale may create additional rules. For example, a rule may determine, during authentication of a legitimate agent, that additional protection is desirable for a given ICTO 710. The rule may then create additional access, defensive, cloaking and the like requirements. In some embodiments, the rules may only be executable by the dynamic participant controller 702, or may be stored in a binary form as a participant of the ICTO, or a combination thereof. Based on the rules and requirements of the identity module 708, the intelligence module 709 acts on its rales and requirements as supplied by the owner agent. Portable dynamic rule set 711 identifiers may vary from access to access, and may vary depending on a type of agent. For example, for a human user, portable dynamic rule set 711 specified identifiers may include account keys, transaction information, context keys, associated intents, and the like. For an electronic object, a digital asset, or any other potential agent, portable dynamic rules set 711 identifiers may also include an IP address, a URL, a file specification, and the like.

In some embodiments, rules have read/write access to the digital participants 701, even while the digital participants 701 are protected by the ICTO 710. In other words, a rule may read and write data to the mixture metadata 705 and to the owner data 706 of the ICTO 710. This may be useful for recording access information such as date, time, place, and the like, and, in some cases, to destroy the data if an attack is detected. Some examples of decisions made or actions taken by the intelligence module 709 may include, but are not limited to: evaluating object content and context for validity; challenging an agent for proof of identity; interacting with client code; contacting a server for verification of trust; causing the ICTO 710 to self-destruct; maintaining a history of object access and sending the history information to a server, by email, SMS, FTP or stored with the ICTO 710; allowing on-line and/or off-line object access; creating new rules based on dynamic server updates; cloaking and de-cloaking data; and mangling and unmangling data.

The use of said portable dynamic rule sets 711 has various benefits and purposes. In one exemplary embodiment, access rules may utilize internally created, internally managed, unique keys based on owner-specified criteria. Said unique keys may be based on temporal data, environment data, or any other algorithm specified by an owner's rule set. As another example, said rules may access protected identity artifacts within the ICTO 710 in order to authenticate and validate the agent without exposing the protected data to the world. As yet another example, because said rules are self-contained, portable, platform independent and are therefore, included within the ICTO 710, rules may be written in such a way as to allow the ICTO 710 to be fully protected from unauthorized access even when offline.

As a further example, rules may add nested protection. If the ICTO 710 protects one or more ICTOs 710 within the current or outer ICTO 710, the outer ICTO 710 may be able to communicate with one or more of the ICTOs 710 managed as part of the owner data 706 of each. Where the outer ICTO 710, or vice-versa, can cause the execution of rules managed within any of the ICTOs 710 included in the owner data 706 of the outer ICTO 710 or create new rules as a result of rules contained in one or more of the included ICTOs 710. Another example, the rules self-contained within the PDRS 711 of an ICTO 710 are self-governing. If the ICTO 710 protects a document that is meant to be accessed by a single legitimate agent within one hour of creation for a maximum of one hour after access, a rule may implement the timer and issue a self-destruct mechanism after expiry.

As previously described, the dynamic participant controller 702, or mixer, utilizing a portable dynamic rule set 711 creates a mixture of the outer cloaking patterns 704, mixture metadata 705, the owner data 706, the inner cloaking patterns 707, the identity module 708 and the intelligence module 709 that makes up the ICTO 710. In some embodiments, various components of the ICTO 710 may be combined for encoded checksums to detect tampering. For example, the entire ICTO 710, the rules, the owner data, and/or the participant data may each be validated by a checksum 712. The checksum 712 may be a hash value generated based on the contents of the checksum 712 targets. In some embodiments, the algorithm used to generate the checksum is sensitive enough to reliably detect a change of a single bit value of even a large document. Some suitable algorithms include MD5 and SHA, though any other suitable algorithm may be used. Each checksum 712 may be appended, prepended, or otherwise combined with the. checksum target for storage, or may be. stored in a separate location.

Figure 2:
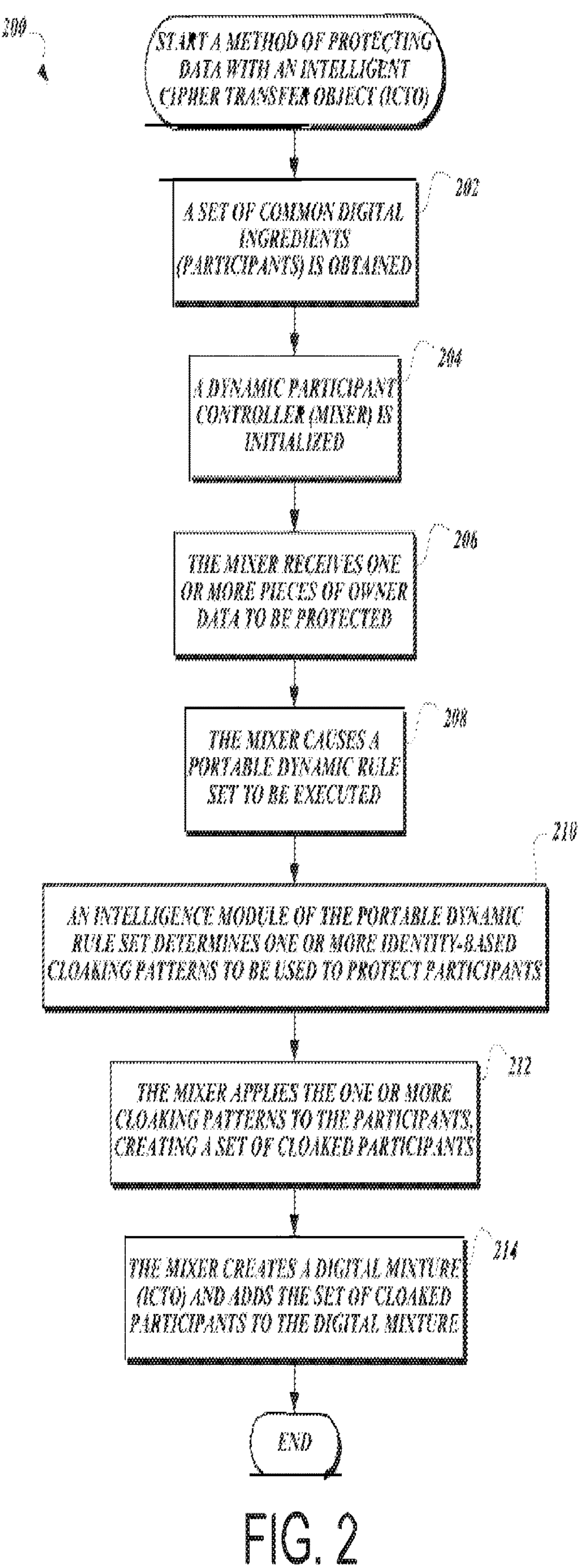
FIG. 2 shows a flowchart that illustrates an exemplary embodiment of a method of constructing an ICTO according to various aspects of the, present invention.

FIG. 2 is a flowchart that illustrates an exemplary embodiment of a method 200 of constructing an ICTO 115 according to various aspects of the present invention. While the illustrated method 200 describes creation of a relatively simple ICTO 115, one of ordinary skill in the art will understand that similar techniques may be used to create much more complex ICTOs 115. In some embodiments, the mixer 110 is configured to perform the method 200. In some embodiments, the method 200 is performed by a computing device, as described below, that is configured to provide the functionality of the mixer 110. One of ordinary skill in the art will recognize that the construction and utilization of the ICTO 115 is neither dependent on the type of said computing device nor on any operating system associated with said computing device, but may instead by constructed and utilized via any suitable means.

From a start block, the method 200 proceeds to block 202, where a set of common digital ingredients or participants is obtained. The common participants are participants 101 which may be used in more than one ICTO 115, or may at least have similar corresponding components in more than one ICTO 115, and are specified and/or generated by the mixer 110 for inclusion in the ICTO 115. For example, the. object descriptions 102, the mixture metadata 104, the cloaking patterns 107, the identity module 109, and the intelligence, module 111 may all be common participants. Next, at block 204, a dynamic participant controller ("mixer") 110 is initialized. In some embodiments, initializing the mixer 110 may include verifying that the mixer 110 is being executed by an expected or otherwise trusted application. At block 206, the mixer 110 receives one or more pieces of owner data 106 to be protected. As discussed above, in some embodiments the owner data 106 may be optional, and the access protection features of the ICTO 115 may be used to verify user identities and/or obtain signatures from users.

The method 200 proceeds to block 208, where the mixer 110 causes a portable dynamic rule set 108 to be executed. At block 210, an intelligence module 111 of the portable dynamic rule set 108 determines one or more identity-based cloaking patterns to be used to protect participants 101, and at block 212, the mixer 110 applies the one or more cloaking patterns to the participants 101, creating a set of cloaked participants.

The portable dynamic rule set 108 determines a cloaking pattern to be applied to each participant 101 based on the desires of the owner of the data to be protected. Different cloaking patterns may be applied to each participant 101. Further, each participant 101 may be protected using separate cloaking patterns for access by different agents. In other words, a participant 101 such as owner data 106 may be protected by a first cloaking pattern for access by a first agent, and protected by a second cloaking pattern for access by a second agent. The selection of cloaking patterns may be based on an attribute of the participant 101 to be protected, an attribute of the agent to be given access to the data, a location, an intent, and/or any other suitable piece of information. Selection of a cloaking pattern may include selecting from a preexisting cloaking pattern, and/or may include creating a new cloaking pattern from a combination of protection techniques supported by the mixer 110. Records of the applied cloaking patterns may be stored in the mixture metadata 104.

Cloaking patterns describe transformations applied to a participant 101 to protect the participant 101 within the ICTO 115, and how those transformations may be reversed to access the participant 101. The transformations may include, but are not limited to, data compression, data normalization, and encryption/decryption. A given cloaking pattern may include one or more of these techniques, or other techniques not listed here. Data compression may reduce the overall size of the ICTO 115, which may in turn improve transport times and bandwidth usage. Data compression may be performed by any suitable lossless compression algorithm including, but not limited to, DEFLATE, LZW, LZR, LZX, JBIG, DjVu, and/or the like. Data normalization is performed by any suitable process that places the data in a form that may efficiently be processed. In some embodiments, the data may be passed through a Base64 encoding algorithm, to convert the data, whether binary or text format, into a normalized alphanumeric string. This is an example only, and should not be seen as limiting. In other embodiments, other algorithms may be used to normalize the data.

In some embodiments, a cloaking pattern may cause the identity module 109 and the intelligence module 111 to apply separate encryption techniques to different components of the participants 101. For example, a first encryption rule, when executed, may identify and encrypt a first portion of the encrypted digital mixture 115 while leaving a second portion of the encrypted digital mixture 115 unchanged. A second encryption rule, when executed, may then identify and encrypt the second portion of the encrypted digital mixture 115 using a different encryption algorithm, a different encryption key, and/or the like.

In some embodiments, the cloaking patterns and/or the portable dynamic rule set 108 may establish two or more nested layers of encryption. For example, execution of a first encryption rule may encrypt a first portion of the encrypted digital mixture 115. Execution of a second encryption rule may then cause the encrypted first portion of the encrypted digital mixture 115 to be encrypted again, along with the first encryption rale and a corresponding first decryption rule. Hence, to later access the first portion of the encrypted digital mixture 115, a second decryption rule corresponding to the second encryption rule is executed to decrypt the doubly encrypted first portion of the encrypted digital mixture 115 and to obtain the first decryption rule. The first decryption rule is then executed to decrypt the first portion of the encrypted digital mixture 115 to generate a plaintext version of the first portion of the digital mixture 115.

Once the cloaking patterns have been applied to the participants 101 to create the set of cloaked participants, the method 200 proceeds to block 214, where the mixer 110 creates a digital mixture (ICTO) 115 and adds the set of cloaked participants to the digital mixture 115. In some embodiments, additional protection may be applied to the digital mixture 115 as a whole, such as shuffling of the data, additional encryption or digital signatures, and/or the like. The method 200 then proceeds to an end block and terminates.

One of ordinary skill in the art will understand that certain steps have been omitted from FIG. 2 for case of discussion. However, other steps not explicitly illustrated in FIG. 2 may also be included in the method 200 without departing from the scope of the present disclosure. For example, if any errors are detected while applying the cloaking patterns or executing rules, the method 200 may stop, and may not produce a completed ICTO 115. As another example, in some embodiments, the owner data 106 may include one or more ICTOs as a way of providing nested protection. In some embodiments, rules within a nested ICTO may be provided with access to participant data 101 within the outer ICTO 115. In some embodiments, a rule within a first ICTO may cause a second ICTO to be created, and cause the first ICTO to be added to the second ICTO such that the first ICTO is nested inside of the second ICTO. Likewise, in some embodiments, a rule within a first ICTO may cause a second ICTO to be created, and cause the second ICTO to be added to the first ICTO such that the second ICTO is nested inside of the first ICTO.

Figure 8:
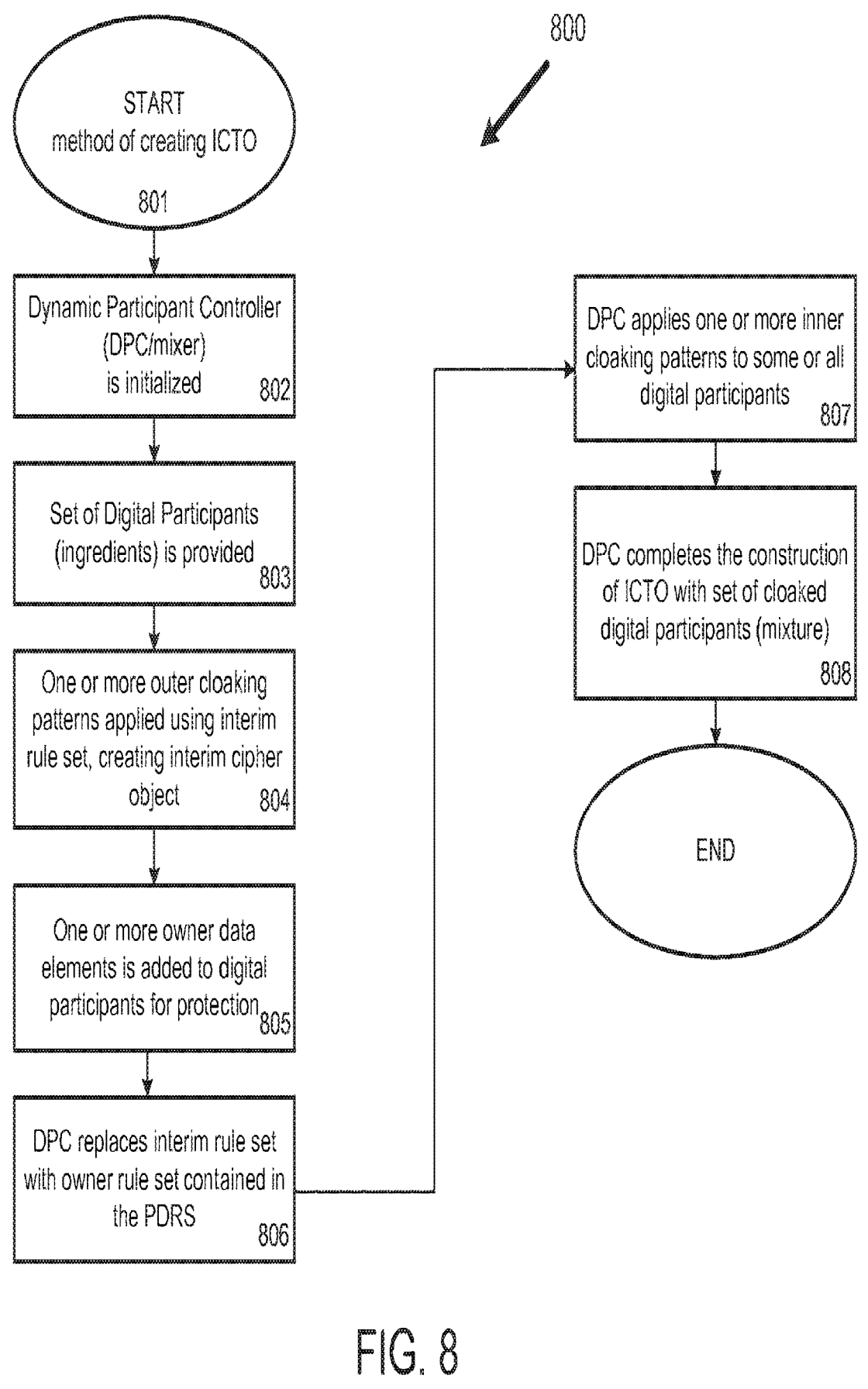

FIG. 8 is a process flow that illustrates an alternative exemplary embodiment of a method 800 of constructing an ICTO 710 according to various aspects of the present invention. The method 800 shown describes the creation of a simple ICTO 710: however, utilizing similar techniques one may construct a complex ICTO. In some embodiments an ICTO-aware application, device or operating system is configured to initiate and facilitate the method 800. The construction and utilization of an ICTO 710, simple or complex, is not dependent on a specific operating system or device.

From Start 801, the method 800 begins with initialization 802 of the Dynamic Participant Controller 702 or mixer. In some embodiments, initialization of the mixer 802 may include validation that the object is an authentic ICTO and/or that the request to initialize is from an ICTO-aware application, device, operating system or other ICTO-aware process. Proceeding to block 803, a set of digital participants 701 is provided to the mixer 702 for inclusion in the ICTO 710. The digital participants 701 may be used in more than one ICTO 710, or may at least have similar or common components in more than one ICTO 710. For example, the outer cloaking patterns 704, the mixture metadata 705, additional cloaking patterns 707, the identity module 708, and the intelligence module 709 may all be considered common digital participants 701. Proceeding to block 804, the mixer 702 utilizing one or more algorithms selects one or more outer cloaking patterns 704 to be applied to the set of digital participants 701 utilizing an interim rule set to create the initial cloaking patterns for the ICTO 710, creating the initial interim cipher object 703. Proceeding to block 805, one or more owner data elements are added to the digital participants set for inclusion in the ICTO 710. In some embodiments, owner data 706 may be optional, and the access protection functionality of the ICTO 710 may be utilized to verify legitimate agent identities and/or for legitimate agent signatures.

The method 800 proceeds to block 806, where the owner's rules are obtained from the PDRS 711 and utilized by the mixer 702 to replace the interim rale set initially used in the creation of the ICTO 710. Proceeding to block 807, utilizing one or more algorithms the mixer 702 selects one or more inner cloaking patterns 707 to be applied to some or all of the digital participant set 701, inclusive of the owner data 706. The, algorithms utilize time as a unique number and owner rules to further randomize the inner cloaking patterns 707. The algorithms used are added to the identity module 708, managed internally by the PDRS 711 and not shared externally. Finally in block 808 the mixer 702 completes the construction of the ICTO 710 creating a set of cloaked digital participants 720. While similar or common digital participants 701 may be utilized as provided in 803, in combination, the method will create a unique digital mixture 808 for each ICTO 710 constructed.

The mixer 702 using one or more algorithms determines which inner cloaking patterns 707 are to be applied to each digital participant 701 while also randomly applying time as a unique number and other internal factors generated by the intelligence module 709. The algorithms utilized by the mixer 702 to select the inner cloaking patterns 707 are then added to the identity module 708, managed internally and not shared/exchanged/exposed externally of the ICTO 710. Each participant 701 may be protected utilizing one or more inner cloaking patterns 707 that may be uniquely different from one or more inner cloaking patterns 707 protecting other participants 701 in the digital mixture 710. For example, a participant such as the owner data 706 may be protected with one or more cloaking patterns and internal rales that are uniquely different than the one or more inner cloaking patterns 707 and internal rules utilized to protect the identity module 708. Further, utilization of one or more inner cloaking patterns 707 and the random use of time as a unique number and internal rules in turn creates unique cloaking patterns that are added to the identity module 708 for each participant 701. The internal rules embedded in the, intelligence module 708 may include but are not limited to such things as location, time, authorization requirements, and the like.

The inner cloaking patterns 707 describe transformations applied to a participant 701 to protect the participant 701 within the ICTO 710, and how some of those transformations may be reversed to access parts or all of the participant 701. The transformations may include, but are not limited to, data compression, data normalization, and encryption. A given inner cloaking pattern 707 may include one or more of these techniques, and/or other techniques. Data compression may reduce the overall size of the ICTO 710, which may in turn improve transport times and bandwidth usage. Data compression may be performed by any suitable lossless compression algorithm including, but not limited to, DEFLATE, LZW, LZR, LZX, JBIG, DjVu, and/or the like. Data normalization is performed by any suitable process that places the data in a form that may efficiently be processed. In some embodiments, the data may be passed through a Base64 encoding algorithm to convert the data, whether binary or text format, into a normalized alphanumeric string. This is an example only, and should not be seen as limiting. In other embodiments, other algorithms may be used to normalize the data.

Inner cloaking patterns 707 may also include one or more encryption techniques. The cloaking patterns may specify methods of deriving encryption keys, may specify particular encryption algorithms, such as, but not limited to, NIST or FIPS, other proprietary encryption algorithms, or key lengths, or may specify other configurable options such as time seeds, Xor encoding, or other industry standard encoding and decoding techniques for generating elements of the cloaking scheme, or combinations thereof. In some embodiments, encryption techniques may perform operations or calculations other than encryption, such as deriving a hash value for the referenced content or the like. In some embodiments, the inner cloaking pattern 707 may store (or may contain rules that require storage of) a record of an encryption key or decryption key used, either in the inner cloaking pattern 707 itself or elsewhere within the ICTO 710, managed internally and not shared externally. When the inner cloaking pattern 707 is used to access the protected information, the cloaking/de-cloaking algorithm(s) and keys are maintained internally and provided to the dynamic participant controller 702 within the ICTO 710 to provide access to the, information, but are not available to the requesting agent or any other agent or application, device, operating system external to the ICTO 710. In other words, the cloaking/de-cloaking algorithms and keys are not stored or exposed outside of the ICTO 710, are not made available to any agents, and so there is no need for external key management functions, thus no vulnerabilities there from and their secrecy is maintained.

In some embodiments, the rules set forth in the intelligence module 709 may cause the mixer 702 to apply separate inner cloaking patterns 707 to separate components of the participants 701. For example, a first rule, when executed, may identify and apply a cloaking pattern to a first portion of the protected digital mixture 710 while leaving a second portion of the protected digital mixture 710 unchanged. A second rule, when executed, may then identify and apply a cloaking pattern to the second portion of the protected digital mixture 710 using a different cloaking pattern with a different pattern, or the like.

In some embodiments, the intelligence module 709 of the portable dynamic rule set 711 may require two or more nested layers of cloaking of some or all of the participants 701. For example, execution of a first rule by the mixer 702 may cloak a first portion of the protected digital mixture 710. Execution of a second rule by the mixer 702 may then cause the cloaked first portion of the protected digital mixture 710 to be cloaked again using a different inner cloaking pattern 707, along with the first rule and a corresponding first cloaking rule. Hence, to later access the first portion of the protected digital mixture 710 a second de-cloaking rule corresponding to the second rule is executed to de-cloak the nested cloaked first portion of the protected digital mixture 710 and to obtain the first de-cloaking rule. The first de-cloaking rule is then executed to de-cloak the first portion of the protected digital mixture 710 to generate a plaintext version of the first portion of the digital mixture 710.

Once the inner cloaking patterns 707 have been applied to the participants 701 to create the set of cloaked participants 720, the method 800 proceeds to block 808, where the mixer 702 completes the construction of a digital mixture (i.e., ICTO) 710. In some embodiments, additional protection may be applied to the digital mixture 710 as a whole, such as shuffling of the data, additional cloaking and/or the like. The method 800 then proceeds to an end block and terminates.

Other steps not explicitly illustrated in FIG. 8 may also be included in the method 800 without departing from the scope of the present disclosure. For example, if any anomalies are detected while applying the cloaking patterns or executing rules, the method 800 may stop, and may not produce a completed ICTO 710. As another example, in some embodiments, the owner data 706 may include one or more ICTOs as a way of providing nested protection. In some embodiments, rules within a nested ICTO may be provided with access to participant data 701 within the outer ICTO 710. In some embodiments, a rule within a first ICTO may cause a second or multiple ICTO(s) to be created, and cause the first ICTO to be added to the second ICTO such that the first ICTO is nested inside of the second ICTO. Likewise, in some embodiments, a rule within a first ICTO may cause a second ICTO to be created, and cause the second ICTO to be added to the first ICTO such that the second ICTO is nested inside of the first ICTO.

Figure 3:
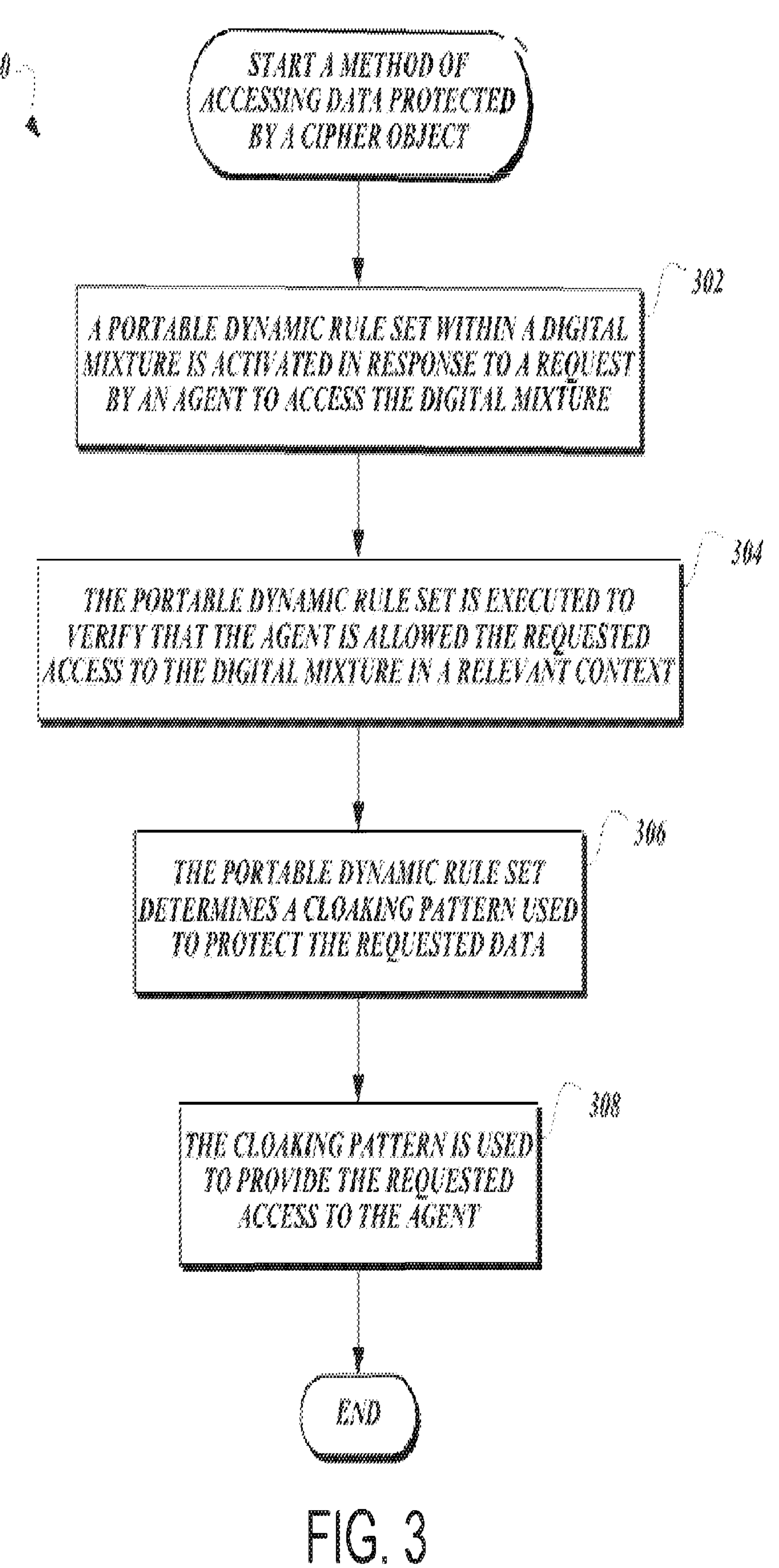
FIG. 3 shows a flowchart that illustrates an exemplary embodiment of a method of accessing data protected by an ICTO according to various aspects of the present invention.

FIG. 3 is a flowchart that illustrates an exemplary embodiment of a method 300 of accessing data protected by an ICTO 115 according to various aspects of the present disclosure. After the ICTO 115 is activated, the ICTO 115 begins verification and validation of its current environment, access attempts, authorized agents, and other conditions as specified in the rule set included in the portable dynamic rule set 108. This verification and validation may be performed once upon startup, continuously during an active period, periodically during an active period, or at any other suitable interval or in response to any suitable, change in state. When rules and agent identity have been positively confirmed, the ICTO 115 permits access to authorized portions of itself while maintaining the homogenous essence of the mixture and protection of the rest of the data.

As with the method 200 described above, in some embodiments the mixer 110 is configured to perform the method 300. In some embodiments, the method 300 is performed by a computing device if one or more processors of the computing device execute computer executable instructions that cause the computing device to do so. As understood by one of ordinary skill in the art, the construction and utilization of the ICTO 115 is neither dependent on the type of said computing devices nor on any operating systems associated with said computing devices. The data protection protocol is embedded in the data set. An activated ICTO 115 can communicate with the data owner (information such as access attempts, alerts to unauthorized locations or unauthorized agents, notification of self-destruct or self-recreation) over the life of the data. Further, because the rules in the. ICTO 115 may update themselves and other portions of the ICTO 115, the ICTO 115 may learn from its environment, and may change its future behavior based on that learning. The protection protocol can be. customized and is unique to each owner, data set, and user combination, as specified in cloaking patterns.

From a start block, the method 300 proceeds to block 302, where a portable dynamic rule set 108 within a digital mixture 115 is activated in response to a request by an agent to access the digital mixture 115. In several embodiments, a super-identity is embedded in the ICTO 115 and includes criteria to verify an identity of an agent attempting to access the ICTO 115, dynamic rules to provide an intelligent awareness that validates the agent and determines the data's current state, and algorithms for data cloaking as specified in cloaking patterns. Verification criteria such as challenge/response pairs, digital signatures, biometric information, and/or the like may be used to verify the identity of the agent. At block 304, the portable dynamic rule set 108 is executed to verify that the agent is allowed the requested access to the digital mixture 115 in a relevant context. The identity module 109 and the intelligence module 111, when activated, assess the current access attempt by the verified agent and establish a level of trust. In some embodiments, this assessment is an on-going process, in that there is a continuous verification and validation of each participant 101: the data owner, the agent (data user) and the data itself. In some embodiments, pre access rules from the portable dynamic rule set 108 may be executed by the mixer 110 to decrypt at least some portion of the ICTO 115 for internal use by the mixer 110 without allowing access to the decrypted data to agents other than the mixer 110. Pre-access rules have access to the participants 101, including the ability to test identity artifacts and evaluate owner and agent data. If the trust level goes down, the proto col reassesses the participants 101. In some embodiments, if the agent attempting to access the ICTO 115 is unable to reestablish their legitimacy, defensive or offensive actions may be invoked. If the agent is able to satisfy the new set of challenges, access will be allowed to proceed or continue.

In some embodiments, the pre-access rules are merely allowed read access to identity or authentication data, but in some embodiments, the pre-access rules may also have write access, which may be used, for example, to record access attempt attributes when opening (or attempting to open) the ICTO 115.

The method 300 proceeds to block 306, where the portable dynamic rule set 108 determines a cloaking pattern used to protect the requested data. The portable dynamic rale set 108 consults the mixture metadata 104 to determine which cloaking pattern 107 was applied based on the identity of the agent, the data request, the context in which the data is being requested, and/or the like. Once the used cloaking pattern 107 is determined, the method 300 proceeds to block 308, where the cloaking pattern 107 is used to provide the requested access to the, agent. Similar to how the cloaking pattern 107 indicated a set of techniques used to protect the requested data, the cloaking pattern 107 also indicates a set of techniques used to reconstruct the requested data from the protected version stored in the ICTO 115. The method 300 then proceeds to an end block and terminates.

Figure 9:
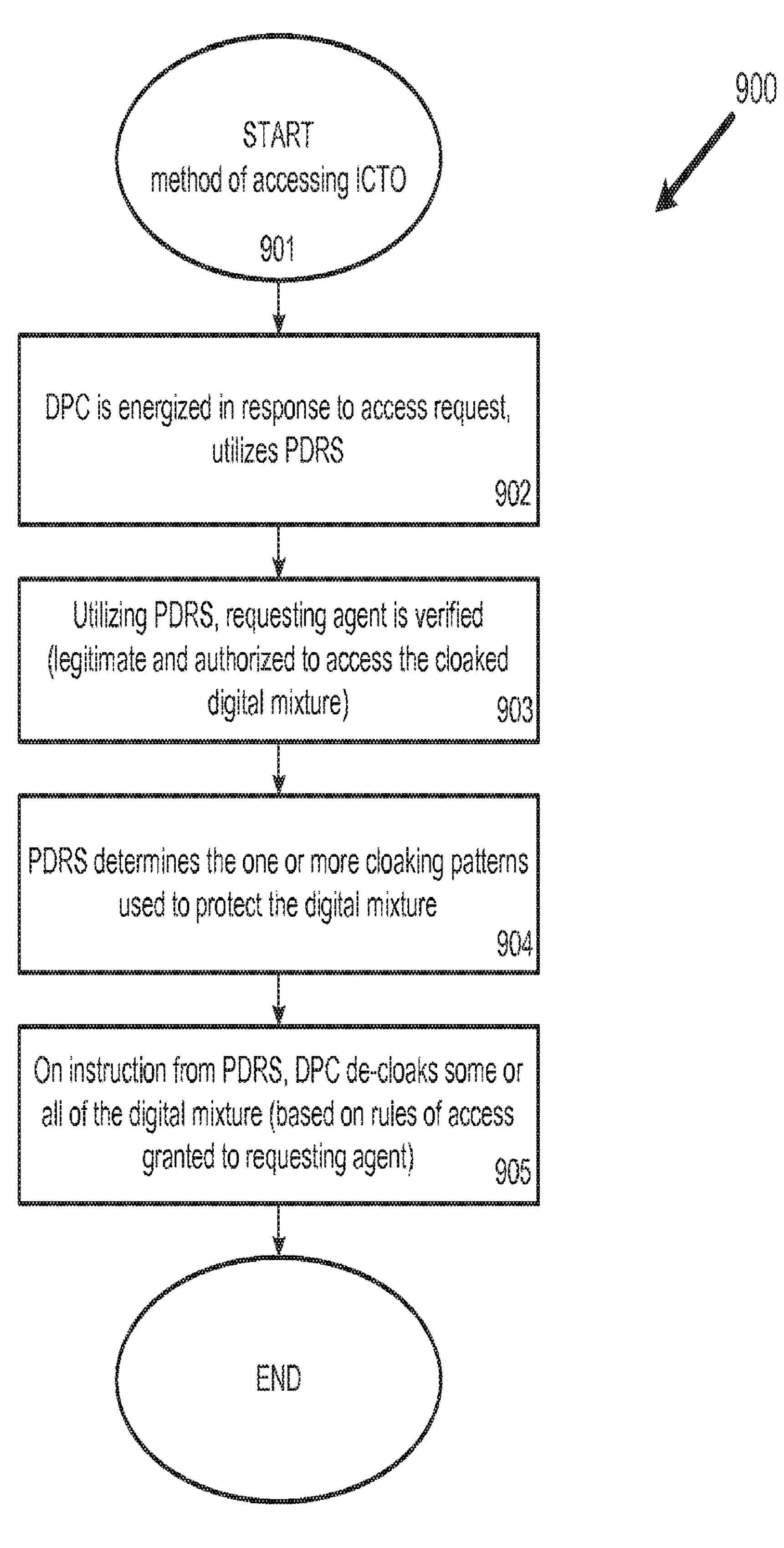
FIG. 9 shows a flow chart that illustrates a exemplary embodiment of accessing an ICTO according to another exemplary embodiment of the present invention.
Figure 10:
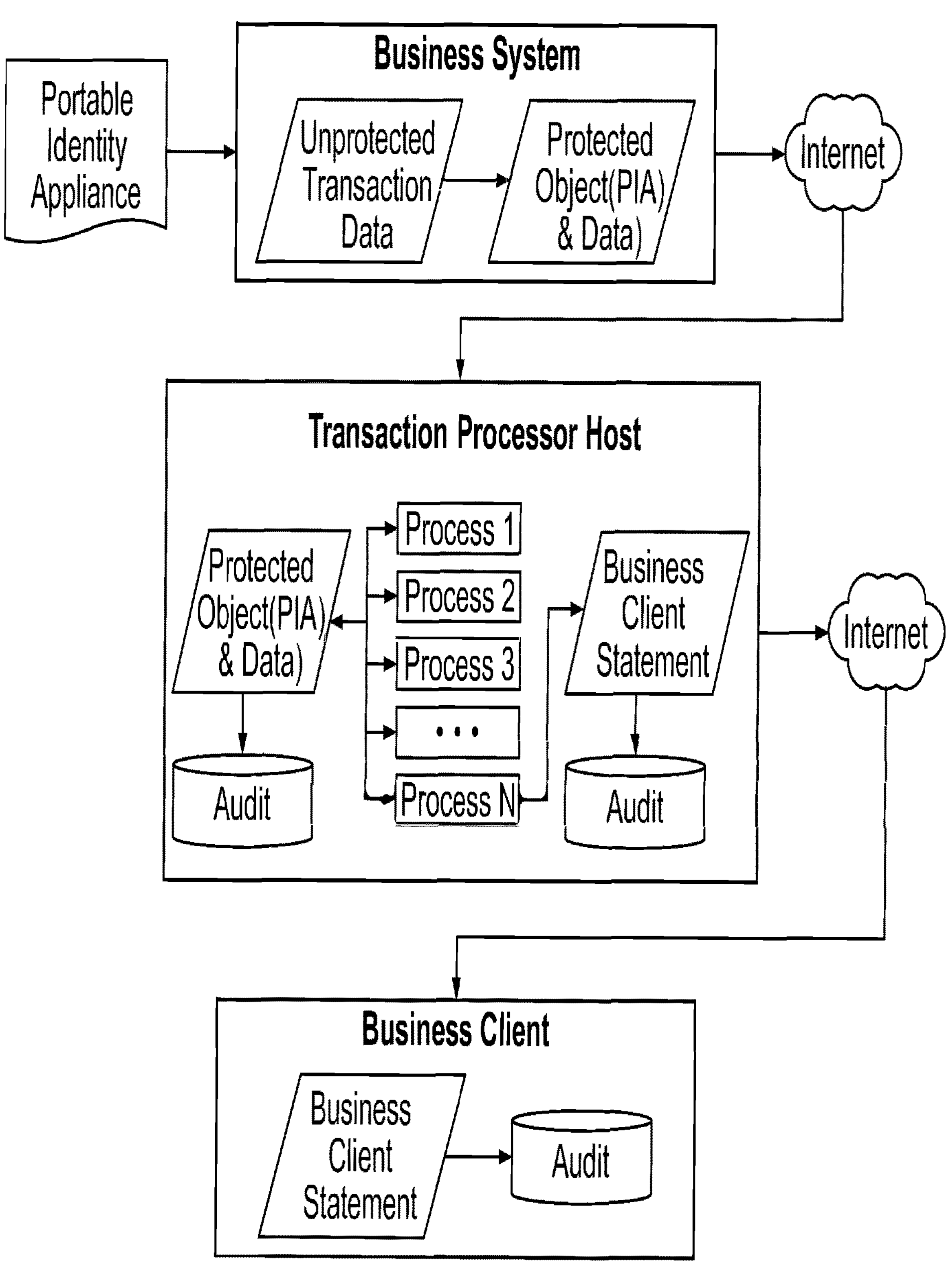
FIG. 10 shows a view of a portable identity appliance system in accordance with another exemplary embodiment of the present invention.
Figure 11:
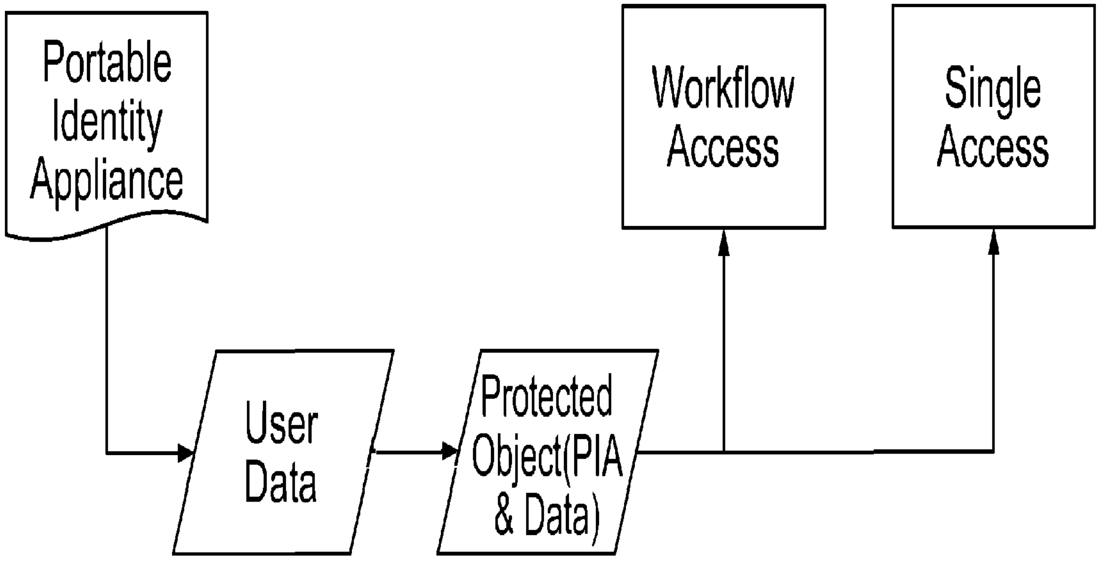
FIG. 11 shows a diagram of a portable identity appliance used to produce a protected object.
Figure 12:
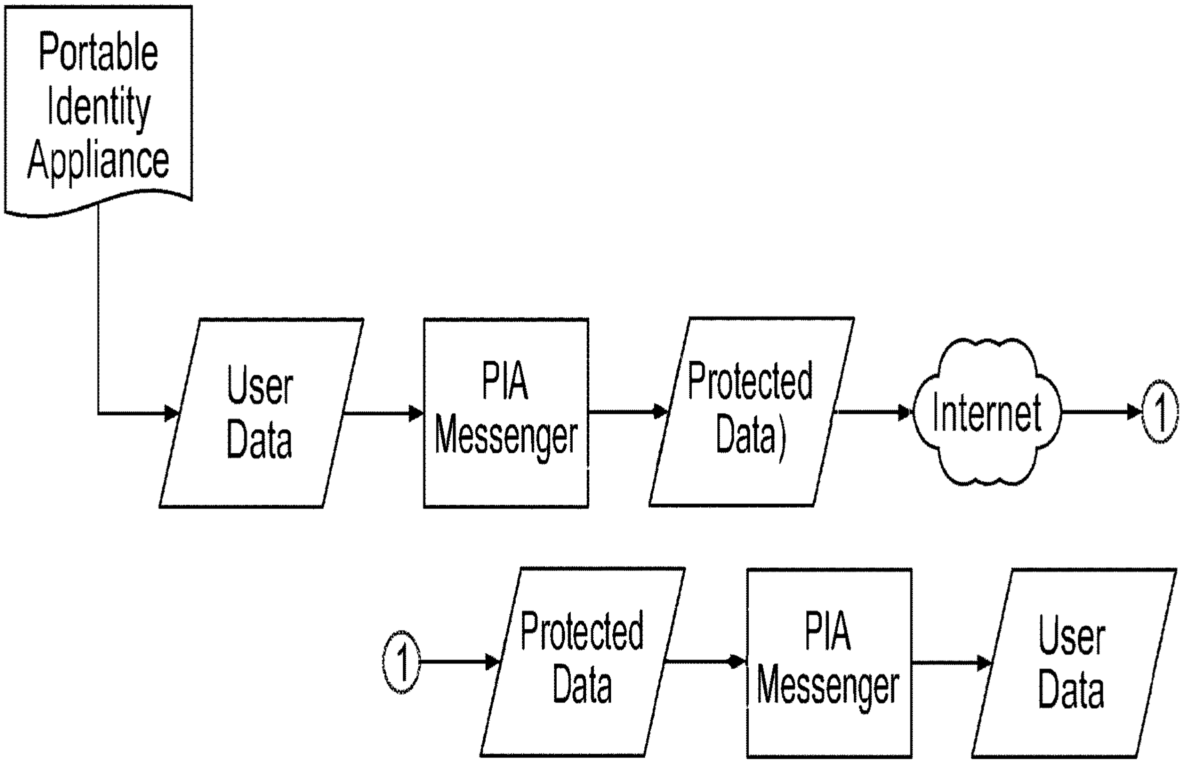
FIG. 12 shows a diagram of a portable identity appliance used to facilitate secure messaging of protected data.
Figure 13:
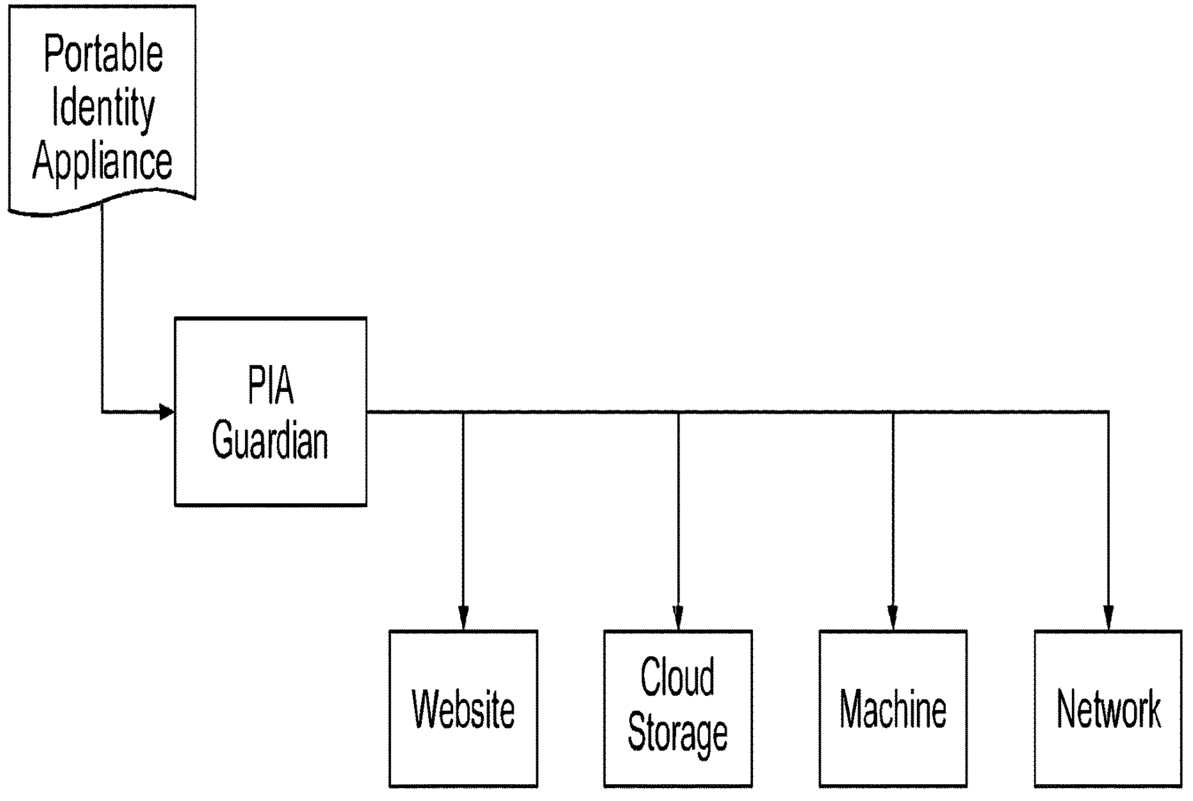
FIG. 13 shows a diagram of a portable identity appliance used to guard access to websites, portals, networks, or other resources.

FIG. 9 is a process flow that illustrates an alternative embodiment of a method 900 of accessing data protected by an ICTO 710. After the ICTO 710 is activated, the PDRS 711 begins verification and validation of the, ICTO's 710 current environment, access attempts, legitimate agents, and other conditions as specified in the PDRS 711.

This verification and validation process is inherently efficient, ensures the integrity of the data and may be performed once upon startup, continuously during an active period, periodically during an active period, or at any other suitable interval or in response to any suitable change in status or state. When rules and legitimate agent identity have been positively confirmed, the PDRS 711 permits access to authorized portions of ICTO 710 while maintaining the homogenous essence of the mixture and protection of the rest of the participants. In some, embodiments, an ICTO-aware application, device or operating system is configured to initiate and facilitate the method 900.

From a start block 901, the. method 900 proceeds to block 902, where the dynamic participant controller 702 within the protected digital mixture or ICTO 710 is energized by an ICTO-aware application, device, or operating system in response to a request by an agent to access the digital mixture or ICTO 710. In some embodiments, the owner/agent identity and/or one or more agent identities are included in the identity module 708 embedded in the ICTO 710 and includes criteria to verify the identity, authenticity and legitimacy of an agent attempting to access the ICTO 710, dynamic rules to provide an intelligent awareness that validates the legitimacy of the agent and determines the data's current state, and algorithms for data cloaking as specified in cloaking patterns. Verification criteria such as challenge/response pairs, external authorizations, biometric information, and/or the like may be used to authenticate, validate and/or verify the. identity of the agent. At block 903, utilizing the portable dynamic rule set 711, the requesting agents are verified in an efficient, full, complete and relevant context and granted access to the digital mixture 710.

The method 900 proceeds to block 904, where the portable dynamic rule set 711 provides the dynamic participant controller 702 one or more cloaking patterns used to protect the requested data based on the identity of the agent, the data request, the context in which the data is being requested, and the like. Proceeding to block 905, the DPC or mixer 702 on instruction from the portable dynamic rule set 711 de-cloaks some or all of the protected data within the ICTO 710 based on the data owner's rules for the legitimate agent, the data request, the context in which the data is being requested, and/or the like managed by the portable dynamic rule set 711.

Other steps not explicitly illustrated in FIG. 9 may also be included in the method 900 without departing from the scope of the present disclosure. For example, if any anomalies are detected while applying the de-cloaking patterns or executing rules, the method 900 may stop, and may not allow access to the protected ICTO 710. Another example, the method 900 may determine legitimacy of a requesting agent to ICTO 710 which may cause external authorizations to be required prior to completion of authorization of the legitimate agent. Additionally, alerts may be sent as a result of legitimate and authorized access to the ICTO 710. As another example, in some embodiments, the method 900 may determine that unauthorized access is being attempted which may cause the PDRS 711 within the ICTO 710 to send alerts, record access attempts and/or the like. In another example, in some embodiments, the method 900 may determine an unauthorized access attempt is underway, and enable access to false data in the ICTO 710, recording activity, sending alerts and/or the like. Alerts include, but are not limited to, failed access attempt, unrecognized access address (which can include device and location specifics), schedule violations, unauthorized movement of an ICTO, and the like.

Accordingly, the present invention results in an ICTO that is self-contained, self-controlling, and self-governing. All access rights, rules of engagement, compliance rules, audit requirements, and similar rules and restrictions as determined by the data owner are contained in the PDRS, and embedded in the ICTO, and thus controlled on behalf of the data owner by the PDRS (whether online or offline, control is maintained from within the ICTO), and executed by the PDRS. The PDRS is the means for self-governance and control upon creation and throughout the life of the ICTO. It travels with the ICTO, complies at all times with the rules established by the data owner, and can be adaptive (i.e., dynamic), based on, but not limited to, the environment (such as place, time, and device), so to self manage and make decision based on learned information. The PDRS does not require any outside sources (e.g., IAM or SIEM systems) or specific operating environments to maintain control and governance. The PDRS controls the complete management of the ICTO from within the ICTO. The PDRS is permanently embedded in the ICTO and travels with the ICTO, thereby creating a self-contained, self-controlled, self-governing entity.

Figure 4:
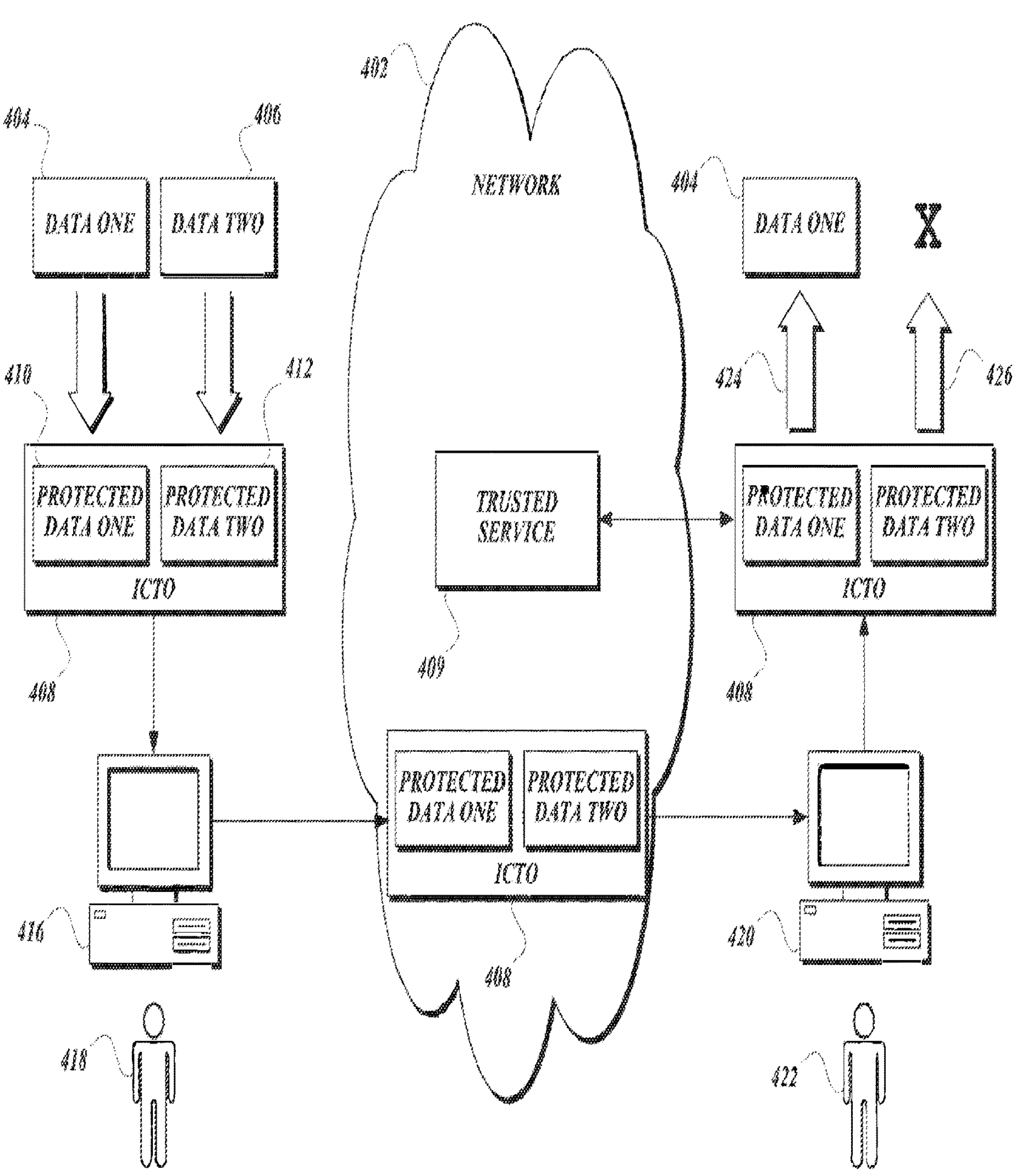
FIG. 4 shows a schematic diagram, that illustrates an exemplary use case for an embodiment of the present invention.

FIG. 4 is a schematic diagram that illustrates an exemplary use case for an embodiment of the present disclosure. One of ordinary skill in the art will recognize that this use case is exemplary only and is described to show certain features of the disclosure, but that this use case does not utilize or describe every feature of the technology disclosed herein. In FIG. 4, a first user 418, using a first computing device 416, uses an embodiment of the present disclosure to protect a first piece of data (data one 404) and a second piece of data (data, two 406). An ICTO 408 is created that includes a protected version of data one 410 and a protected version of data two 412. In creating the ICTO 408, the first user 418 specifies that a second user 422 may access data one 404, but does not specify that the second user 422 may access data two 406. Hence, the ICTO 408 includes a rule in its portable dynamic rule set 108 that allows user two 422, once verified, to access data one 404.

The first computing device 416 transmits the ICTO 408 to a second computing device 420 used by the second user 422 via a network, such as a LAN, a wireless network, the internet, and/or the like. The second user 422 causes the ICTO 408 to be activated, and submits a request 424 to access to data, one 404. The ICTO 408 verifies the identity of the second user 422, which may include processing a challenge/response pair stored in the ICTO 408 and/or consulting a trusted sendee 409 (such as a certificate server, a RADIUS or other authentication server, and/or the like) to verify that the second user 422 is who he purports to be. Once the identity of the second user 422 is verified, the ICTO 408 consults the cloaking pattern used to create protected data one 410, and uses the cloaking pattern to give the second user 422 access to data one 404. The second user 422 may also submit a request 426 to access data two 406. However, because the ICTO 408 has not been instructed to provide access to data two 406 for the second user 422, the ICTO 408 does not allow the second user 422 to access data two 406.

In an alternate process flow, a first computing device 416 transmits an ICTO 408 to a second computing device 420 used by the second user 422 via a network, such as a LAN, a wireless network, the internet, and/or the like. The second user 422 utilizing an ICTO aware application, device or operating system awakens the ICTO 408 which receives a request to access protected data one in the ICTO 408. The ICTO 408 verifies the identity of the second user 422, which may include processing of multiple pairs of challenge/response stored in the ICTO 408 and/or external authorization or the like to verify that the second user 422 is valid and authorized. Additionally a trusted service 409 may be used for further validation of time, physical location and the like based on the rules of access set forth by owner 418. Once the identity of the second user 422 is verified (i.e., established as authentic and legitimate), the ICTO 408 determines the one or more cloaking patterns used to create protected data one 410, and de-cloaks the protected data one 410 revealing data one 404 to the second user 422. The second user 422 may also request to access protected data two 412. However, because the second user 422 is not authorized to access protected data two in the ICTO 408, the second user 422, is not granted access to the protected data two 412.

Though a trusted service 409 that provides authentication services is described, other types of trusted services may be used. For example, if a rule is included the ICTO 408 that only allows access during a given time period, a trusted sendee 409 that provides a trusted date-time value may be used. As another example, a trusted service 409 may seek input from other users while the ICTO 408 is determining whether to grant access to an agent. As illustrated, a trusted service 409 may notify the first user 418 of the access attempt via email, SMS, or any other suitable technique, and may wait to allow the attempted access until a corresponding approval is received from the first user 418.

This use case illustrates several advantages of the present disclosure. Once the ICTO 408 is created, protected data one 410 and protected data two 412 cannot be accessed without invoking the processing of the ICTO 408 to request access. Accordingly, the data is protected when the ICTO 408 is stored on the first computing device 416, when the ICTO 408 is in transit on the network 402, and when the ICTO 408 is stored on the second computing device 416. Also, even though the ICTO 408 provides access to the second user 422 to data one 404, data two 406 is nevertheless protected from access.

Figure 5:
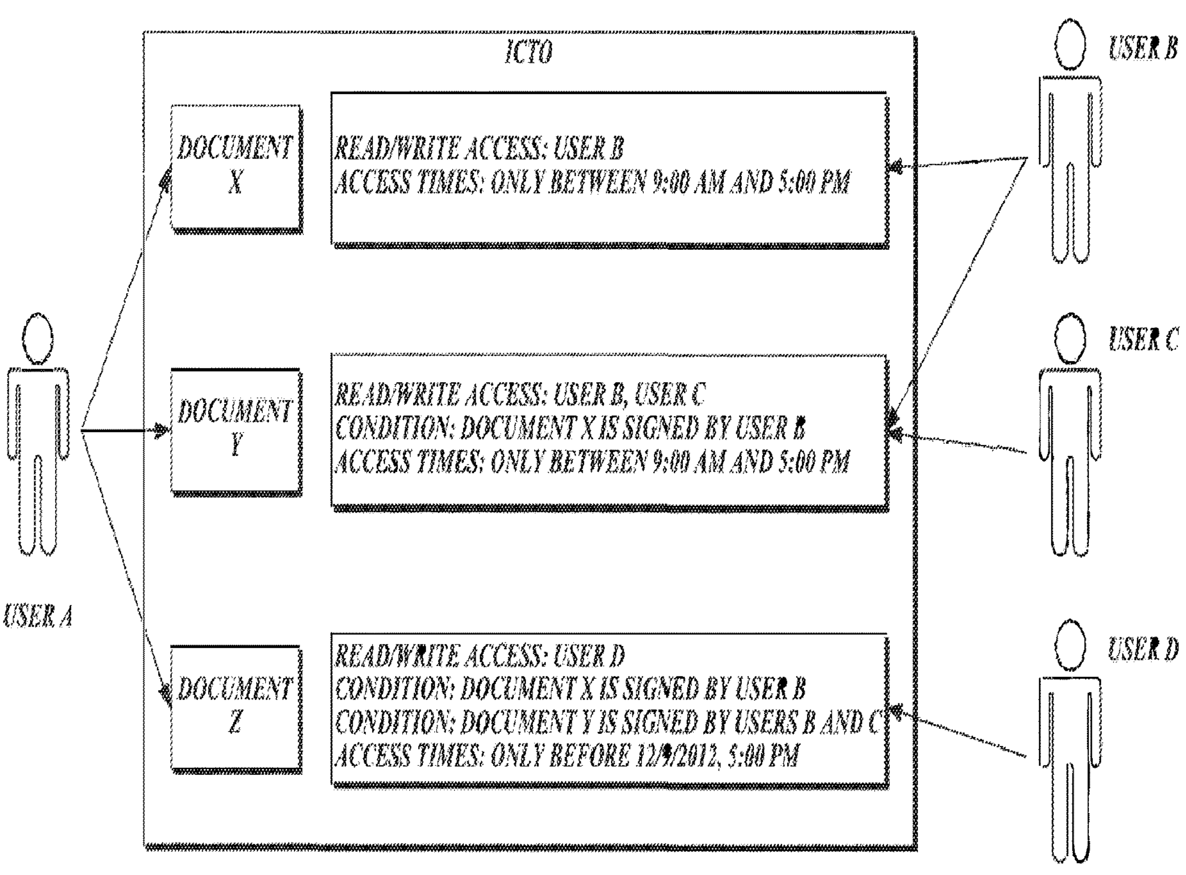
FIG. 5 shows a schematic diagram that illustrates aspects of an exemplary workflow for an embodiment of the present invention.

While this simple use case illustrates several features of the present disclosure, much more complex use cases are also possible. For example, FIG. 5 is a schematic diagram that illustrates aspects of an exemplary workflow for an embodiment of the present disclosure. A first user ("User A") may have a set of documents ("Documents X, y, and Z") to be approved and signed, maintaining confidentiality throughout the transaction, by a second user ("User B"), a third user ("User C"), and a fourth user ("User D"). Document X needs to be signed by User B. Document Y needs to be signed by User B and User C, but only after Document X has been signed. Document Z needs to be signed by User D, but only after Documents X and Y have been signed. Further, Document X and Document Y must be signed during working hours (e.g., between 9 AM and PM) to ensure compliance with local corporate, policy, while Document Z (the working draft of Doc Y) must be signed immediately upon approved signatures of Doc X and Y, the audit logged, and then Doc Z destroyed, with the audit also logged.

Embodiments of the present disclosure will support such a workflow. User A creates an ICTO that includes Documents X, Y, and Z. User A creates an access rule for Document X that allows User B to review and sign Document X. User A creates an access rule for Document Y that allows User B and User C to review and sign Document Y once the signature on Document X is obtained. User A may create an access rule for Document X that allows User C to review Document X to check for a signature, or the access rule for Document X may detect the signature applied to Document X, and may dynamically update the access rule for Document Y that allows it to be signed once the signature is detected. User A creates an access rule for Document Z that checks for signatures on Documents X and Y, and upon detecting such signatures, User D is allowed to sign Document Z. Each of these rules also enforces the associated time requirements, and does not allow access if the time requirements are not satisfied. User A may also create a rule that reports any access to any of the. documents back to User A, so that User A may monitor the process. Each of the rales may specify how each user is to be identified, the related privileges, devices from which the users are allowed to access the documents, and locations from which the users are allowed to access the documents.

Once, for example, User B receives the ICTO, User B invokes an application configured to activate the executable code within the ICTO. The executable code determines the identity of User B, either by consulting a trusted identity service, by checking the response to a challenge included in a rule, or by any other method. Once the identity, time, location, and other requirements are satisfied, User B is allowed to access Document X, but not any of the other documents. After User B signs Document X, the ICTO is transferred to the next user, and enforces the protections on the documents as the ICTO passes through the rest of the workflow.

Alternatively, for example, User B receives the ICTO, User B invokes an ICTO aware application, which activates the PDRS within the ICTO. The executable code determines the identity of User B by utilizing the identity credentials stored within the ICTO which presents multiple challenge/response pairs and/or external authorizations codes. Once the identity, time, location, and other requirements are satisfied, User B is allowed to access Document X, but not any of the other documents. After User B signs Document X, the ICTO is transferred to the next user, and enforces the protections on the documents as the ICTO passes through the rest of the workflow.

In another exemplary embodiment, protection protocol is instituted in a portable identity appliance (PIA). The PIA defines a portable and discrete digital identity using an instinctive and autonomic authentication method. The PIA ultimately implements an incorporated ICTO protocol, thus becoming an intelligent object itself. In several embodiments, the PIA is an ICTO that does not include owner data (e.g., files, images, and the like). The PIA comprises an ICTO that utilizes the PDRS along with additional publicly available information (similar to the information available on a business card or in a public directory) about the owner, but without necessarily containing owner data, the PIA thus is a self-protecting, self-controlling, self-governing ICTO with the purpose of representing, irrefutably, the, owner identity.

As seen in FIGS. 10-13, once the protected PIA is created, it can combine with data to produce a SPDO, facilitate the transmission of secure message between one or more parties (e.g., validating and maintaining sender and receiver legitimacy and data integrity), and provide a secure, trustworthy identity that can be used to assure or guard websites, portals, networks, or other resources.

The PIA thus present numerous advantages over existing signature techniques. Existing signature techniques are typically based on certificates that are purchased from a certificate authority. Certificates are presumed trust-worthy based on who holds the cert and who issues the cert. However, certificates can be stolen, can be spoofed, and are not based on a uniquely defined identity.

Thus, a ICTO may be used for irrefutable verification of identity where a "signature" is required. Signature ICTOs can be utilized as external identity verification in conjunction with an ICTO containing legal documents requiring absolute verification of identity. The Signature ICTO(s) can become part (embedded) of the "final" legal documents contained within the original ICTO. Further, Signature. ICTOs can be included within the ICTO (i.e., nested) as additional protected data elements in addition to the owner documents requiring signature, thus pre-defining and providing pre-verification of the required signers traveling with the documents. Signature ICTOs also can be used as irrefutable verification of identity in documents that are not included in an ICTO but rather in an ICTO aware application. For example, they can be used to provide acceptance of Terms and Conditions electronically, or acknowledgement of privacy notices.

Signature ICTOs in the context of document signing can be thought of as a digital version of the owner that has been "legally verified and notarized," but also is irrefutable. Each Signature ICTO, just like an ICTO with owner data, is unique and therefore cannot be "spoofed" by a person or entity trying to pretend to be the actual owner of the Signature ICTO. Additionally, a Signature ICTO does not have to represent a human; it can represent a machine, whereby a digital process flow requires signatures (verifications) along the way in order to confirm the validity of the authorization to proceed; and this signature must be documented. Signature ICTOs can be used anywhere a standard digital signature is required today, but are not limited to just how digital signatures are used today. As discussed above, in several embodiments there must be ICTO-awareness as a pre-requisite for use.

Figure 14:
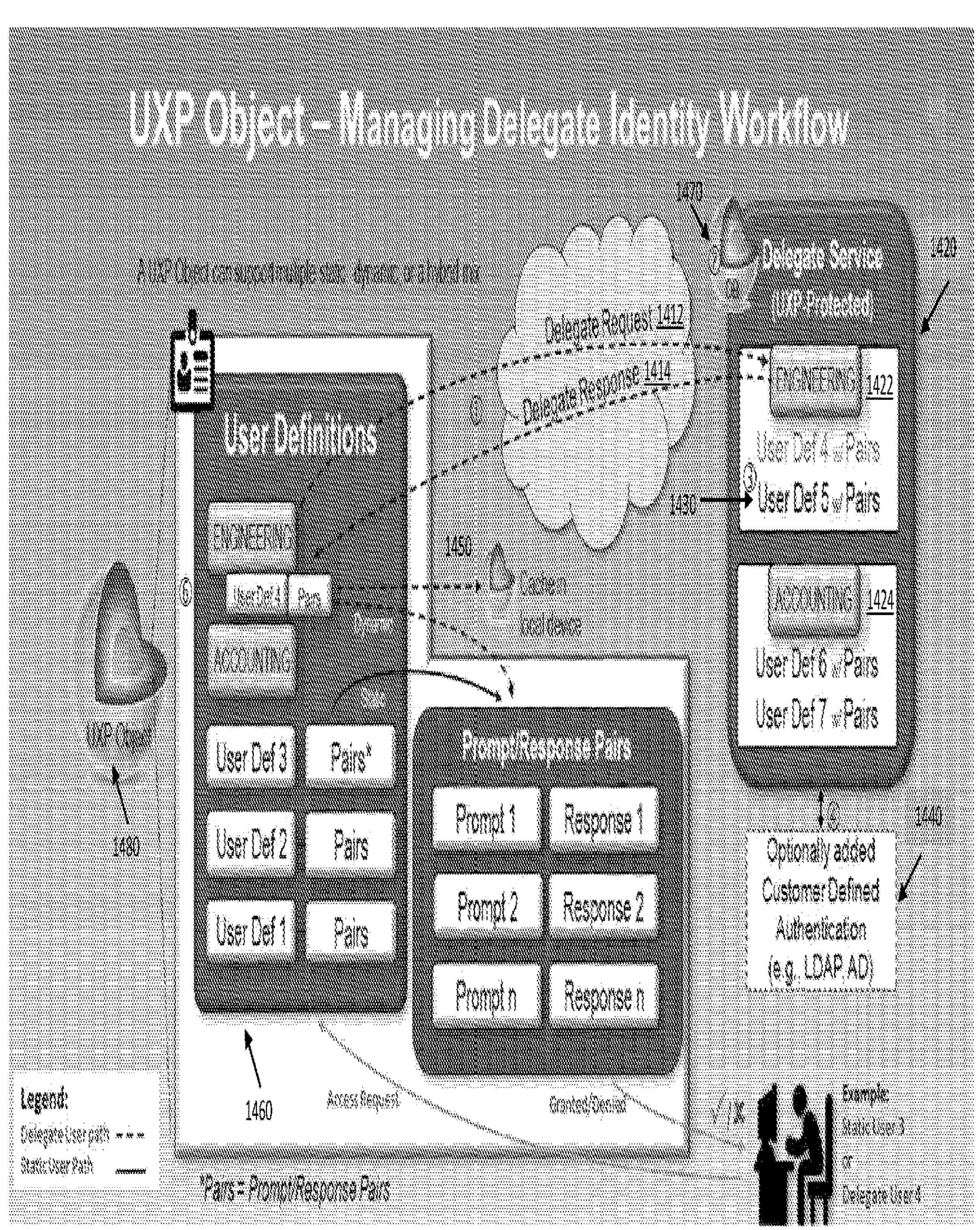
FIG. 14 shows a diagram of a delegate access management system and an authentication operational flow, according to some embodiments.

FIG. 14 illustrates an architecture of a Delegate access management system and an authentication operational flow, according to some embodiments. In certain embodiments the invention provides additional capabilities to allow for a flexible user access and management protocol to be included in the SPDO creation and usage processes. In such cases, a centralized web service operates as a user access authentication service that is external from the SPDO. Use of such service avoids unbundling the SPDO and re-bundling the SPDO to add authorized users to or delete users from the package, as well as implementing any changes to the required credentials, permissions and other attributes associated with any particular user.

By associating each SPDO with one or more Delegates, the SPDO and its associated user credentials can be managed securely and dynamically without compromising security. In addition, such techniques facilitated a compartmentalized access management, in which multiple entities (e.g., departments in an enterprise) can independently manage their own SPDO user access lists for each document protected using the SPDO protocol. This technique also provides a mechanism for continuous access while accessing documents and other objects protected using this approach while offline.

More specifically, a dynamic user access protocol uses Delegates, which are defined as pseudo user objects that include as an attribute the address of a web service that resolves user access permissions for the SPDO. A SPDO designer can thus build a SPDO to include one or more Delegate objects. When this SPDO is accessed by a user, the SPDO reader uses the Delegate object to access an external service that can resolve the name of its constituent users and access their credentials and meta data. The advantage of this dynamic technique is that the user list can be changed at any time without impacting or having to rebuild the SPDO.

In some embodiments, a data designer may build both a static user access list and Delegate object(s) in a data protection system, thus implementing a "hybrid" approach. For example, Delegates may be used to manage a dynamic user access list, whereas a static user access list may include department heads, document owners, or other users whose access credentials will not change.

The Delegate access management system may be not limited to the systems and methods in the present disclosed embodiments, but it may be applied to any type of data object framework.

As described above, the advantages of using a Delegate access management system may include providing a flexible mechanism and a broad domain for using the data protection systems, allowing a data protection system to include secure management of a dynamic user access list, without compromising security of the system, and allowing a data protection system to include a compartmentalized access management, in which multiple entities (e.g., departments in an enterprise) may independently manage their own user access lists for each secure document, resulting in a mechanism for continuous access when the systems do not have access to a network (that is, off-grid).

In the present embodiments, a data protection system disclosed may include zero, one, or a plurality of built-in Delegates. For example, if a user needs to share a document with both the Engineering department and Accounting department with different management structures, the user may protect the document by building an engineering Delegate object 1422, and an accounting Delegate object 1424 in a data protection system. The Delegates 1422, 1424 may point to different authentication services (e.g., one for each department). Each service may authenticate users to access the data protection system independently so that the accounting department may manage its own users, and the engineering department may manages its own users through the corresponding services.

To create the dynamic Delegate object, a data designer may create, or use an existing delegate service 1420 within a web services framework. The Delegate service 1420 may include one or more Delegates (1422, 1424). Each Delegate (1422, 1424) may include an initial dynamic list of authorized users (e.g., a dynamic user access list 1430) to access a data object (e.g., a SPDO 1480). In some embodiments, the initial list of authorized users is empty, while in other embodiments, the initial list of authorized users includes at least one user. A data designer may then use the address of the Delegate service 1420 to construct a Delegate object 1470. The construction of the Delegate object 1470 may include delegating pseudo user objects, and/or building an initial static list of authorized users (that is, a built-in static user access list 1460) into the SPDO.

When attempting to access the data withing the SPDO, a user may provide login credentials (e.g., their user ID) and request access to data within the SPDO. A SPDO reader may then access the SPDO 1480 and search the provided login credentials (e.g., user IDs) in the built-in static data access list 1460.

If the SPDO reader finds the user in the built-in static user access list, it may execute a corresponding set of challenge prompt and responses included in the user's meta data and verify the provided login credentials. If the challenges are successful and the credentials are verified, the SPDO reader provides access to the user. Otherwise, it may deny the access.

If the SPDO reader does not find the user in the built-in static user access list 1460, or if there are no built-in static user access list 1460, the SPDO reader may send a request 1412 from the SPDO 1480 to the Delegate web service 1420 to search for the user within the first available Delegate (e.g., a dynamic user access list 1430 including authorized user IDs to access the given SPDO 1480).

If the user is found in the first available Delegate, then the Delegate web service 1420 may return a response 1414 (e.g., user ID and its meta data) to the SPDO, and the SPDO reader may also use the access mechanism built into the given Delegate object to find the address of the Delegate service. Otherwise, the Delegate web service 1420 may return with a response indicating failure in authentication, and the SPDO may then search for the user ID in a second available Delegate object within the SPDO.

In some embodiments, the delegate web service 1420 may use an existing enterprise lightweight directory access protocol (LDAP) or active directory (AD) service for the given Delegate (e.g., for additional security) by applying a built-in Delegate callback mechanism. Upon successful authentication by the enterprise LDAP or AD service, the system may return a result 1414 (e.g., user ID and its meta data) to the requesting Delegate in the SPDO.

If the user is not found in the second available Delegate, the system may continue searching in the next available Delegate until all built-in Delegates within the data object are searched. If the user is not found in the static user access list or any of the Delegates, the SPDO reader may deny the access to the SPDO.

In some embodiments, access to the SPDO and the associated the data protection system may be on-grid (i.e., access to a network) or off-grid (i.e., no access to a network). If the data protection system is on-grid when a user tries to access to the SPDO, the SPDO may send a request from a requesting Delegate to the Delegate web service 1420 to access the remote Delegate service and resolve the authentication of the user, as described above. If the data protection system is off-grid when a user tries to access to the SPDO, the SPDO may proceed to access a cached copy 1450 of the access credentials saved locally with the SPDO during previous online access.

For creating a cached copy of the user access credentials, a data designer may turn on a caching option of the Delegate so that the data protection system caches the latest user access credentials and uses the cached credentials when the computer is offline. In some embodiments, a data designer may turn off the caching option to only allow access when connected to a secure network. In some embodiments, the cached copy may be ignored when networked access to the Delegate service is operational, even if a cached copy of the credentials exists or is turned on locally.

If a data designer provides an appropriate permission for caching the access credentials, the SPDO reader may cache the credentials locally 1450 for a given user if the user's authentication is successful. The access credential cache may, in some cases, reside in the same directory as the UXP data object and may also include additional built-in data protection capabilities, such as the ability to self-destruct after a user-specified or system defined time-to-live expires. The access credential cache may also disable itself if, for example, it is accessed from outside the domain (e.g., a system or location) in which it was authorized to operate. In some embodiments, a separate cache may be stored for each user, and the most recent user access credentials may be protected within the SPDO.

Figure 6:
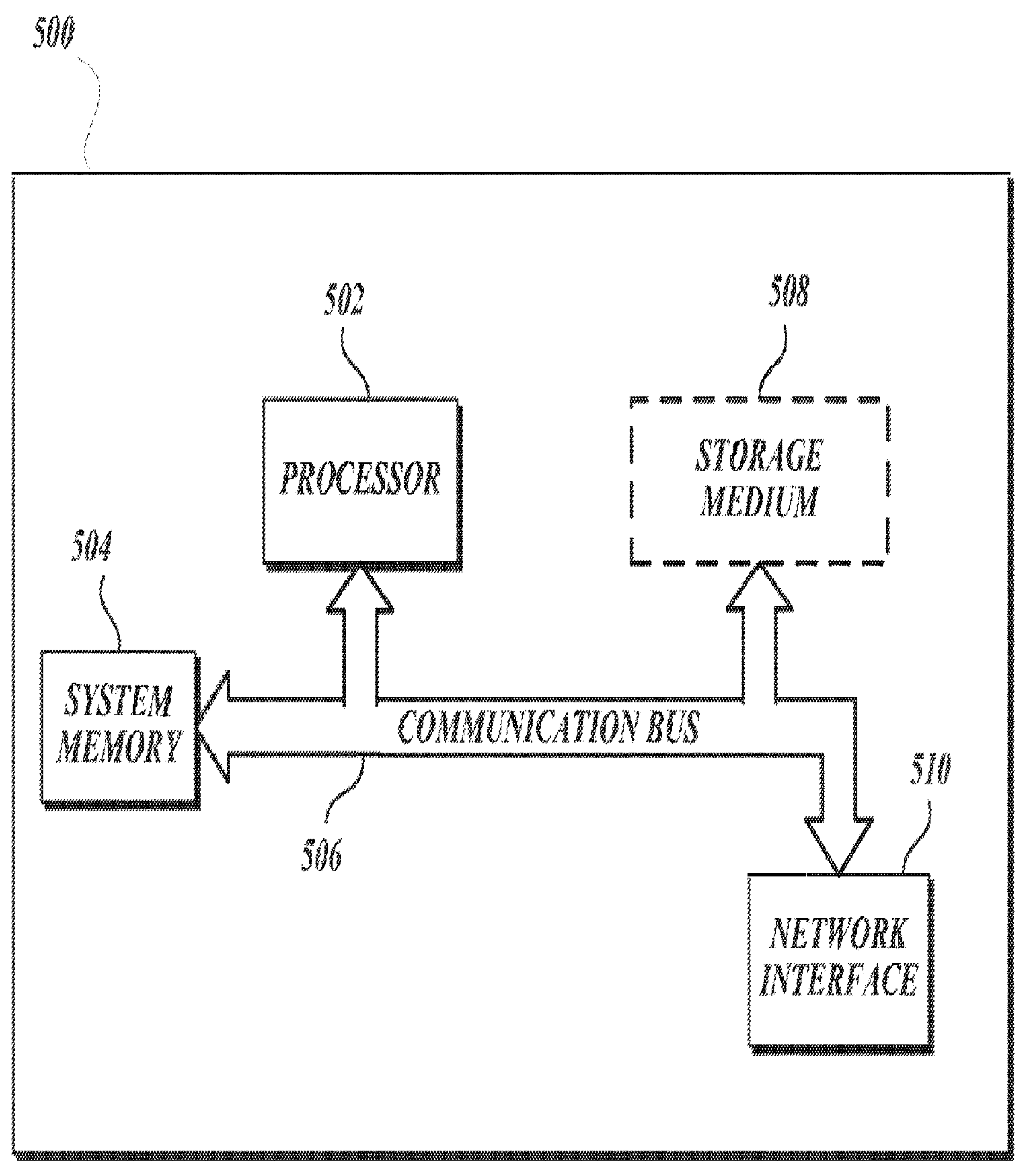
FIG. 6 shows a block diagram that illustrates an exemplary' hardware architecture of a computing device suitable for use with embodiments of the present invention.

FIG. 6 is a block diagram that illustrates an exemplary hardware architecture of a computing device 500 suitable for use, with embodiments of the present disclosure. Those of ordinary skill in the art and others will recognize that the computing device 500 may be any one of any number of currently available or yet to be developed devices including, but not limited to, desktop computers, server computers, lap top computers, embedded computing devices, application specific integrated circuits (ASICs), smartphones, tablet computers, and/or the like. In its most basic configuration, the computing device 500 includes at least one processor 502 and a system memory 504 connected by a communication bus 506. Depending on the exact configuration and type of device, the system memory 504 may be volatile or nonvolatile memory, such as read only memory ("ROM"), random access memory ("RAM"), EEPROM, flash memory, or similar memory technology. Those of ordinary skill in the art and others will recognize that system memory 504 typically stores data and/or program modules that are immediately accessible to and/or currently being operated on by the processor 502. In this regard, the processor 502 serves as a computational center of the computing device 500 by sup porting the execution of instructions.

As further illustrated in FIG. 6, the computing device 500 may include a network interface 510 comprising one or more components for communicating with other devices over the network. Embodiments of the present dis closure may access basic sendees that utilize the network interface 510 to perform communications using common network protocols. In the exemplary embodiment depicted in FIG. 6, the computing device 500 also includes a storage medium 508. However, services may be accessed using a computing device that does not include means for persisting data to a local storage medium. Therefore, the storage medium 508 depicted in FIG. 6 is represented with a dashed line to indicate that the storage medium 508 is optional. In any event, the storage medium 508 may be volatile or nonvolatile, removable or nonremovable, implemented using any technology capable of storing information such as, but not limited to, a hard drive, solid state drive, CD ROM, DVD, or other disk storage, magnetic cassettes, magnetic tape, magnetic disk storage, and the like.

As used herein, the term "computer readable media" includes volatile and nonvolatile and removable and nonremovable media implemented in any method or technology capable of storing information, such as computer readable instructions, data structures, program modules, or other data. In this regard, the system memory 504 and storage medium 508 depicted in FIG. 6 are merely examples of computer readable media.

Suitable implementations of computing devices that include a processor 502, system memory' 504, communication bus 506, storage medium 508, and network interface 510 are known and commercially available. For ease of illustration and because it is not important for an understanding of the claimed subject matter, FIG. 6 does not show some of the typical components of many computing devices. In this regard, the computing device 500 may include input devices, such as a keyboard, mouse, microphone, touch input device, and/or the like. Similarly, the computing device 500 may also include output devices such as a display, speakers, printer, and/or the like. Since all these devices are well known in the art, they are not described further herein.

What is claimed is:

1. A computer-implemented method for creating digitally secured data, the method comprising:

constructing a self-protected data object comprising at least one delegate object and an access list built into the self-protected data object, wherein the at least one delegate object comprises an externally addressable network address and wherein the delegate object communicates with a remote delegate service at the externally addressable network address, wherein the self-protected data object is protected using a protection scheme independent of an operating system, application, or environment;

initializing the remote delegate service with one or more user authentication credentials specific to the access list built into the self-protected data object such that access to the self-protected data object is limited to users associated with the user authentication credentials stored at the remote delegate service; and updating the one or more user authentication credentials specific to the self-protected data object, wherein updating the one or more user authentication credentials specific to the self-protected data object comprises adding new user credentials to the one or more user authentication credentials specific to the self-protected data object such that additional users are provided with authenticated access to the data object.

2. The method of claim 1 wherein updating the one or more user authentication credentials specific to the self-protected data object comprises removing user credentials from the one or more user authentication credentials specific to the self-protected data object such that users associated with the removed user credentials are no long authenticated to access to the data object.

3. The method of claim 1 wherein the one or more user authentication credentials specific to the self-protected data object comprise at least one static user credential.

4. The method of claim 3 wherein the at least one static user credential is incorporated into the self-protected data object, thereby allowing users associated with the at least one static user credential to access the data object without requiring authentication the remote delegate service.

5. The method of claim 1 wherein the self-protected data object comprises a plurality of delegate objects, each comprising a different externally addressable network address such that the remote delegate service applies a different access policy to the self-protected data object for each of the plurality of delegate objects.

6. The method of claim 5 wherein at least a subset of the plurality of data objects are instantiated until a successful authentication is encountered.

7. The method of claim 1 further comprising incorporating a copy of the one or more user authentication credentials specific to the self-protected data object into the self-protected data object such that the one or more user authentication credentials are available as a cached copy absent access to the remote delegate service.

8. The method of claim 7 wherein the cached copy of the authentication credentials are disabled upon expiration of a time to live period.

9. The method of claim 7 wherein the cached copy of the authentication credentials are disabled an attempt to access the data object from an unauthorized domain.

10. A system for creating digitally secured data, the method comprising:

one or more processors; and a memory coupled with the one or more processors wherein the one or more processors executes computer-executable instructions stored in the memory, that when executed:

constructs a self-protected data object comprising at least one delegate object and an access list built into the self-protected data object, wherein the at least one delegate object comprises an externally addressable network address and wherein the delegate object communicates with a remote delegate service at the externally addressable network address wherein the self-protected data object is protected using a protection scheme independent of an operating system, application, or environment;

initializes the remote delegate service with one or more user authentication credentials specific to the access list built into the self-protected data object such that access to the self-protected data object is limited to users associated with the user authentication credentials stored at the remote delegate service; and updates the one or more user authentication credentials specific to the self-protected data object, wherein updating the one or more user authentication credentials specific to the self-protected data object comprises adding new user credentials to the one or more user authentication credentials specific to the self-protected data object such that additional users are provided with authenticated access to the data object.

11. The system of claim 10 wherein updating the one or more user authentication credentials specific to the self-protected data object comprises removing user credentials from the one or more user authentication credentials specific to the self-protected data object such that users associated with the removed user credentials are no long authenticated to access to the data object.

12. The system of claim 10 wherein the one or more user authentication credentials specific to the self-protected data object comprise at least one static user credential.

13. The system of claim 12 wherein the at least one static user credential is incorporated into the self-protected data object, thereby allowing users associated with the at least one static user credential to access the data object without requiring authentication the remote delegate service.

14. The system of claim 10 wherein the self-protected data object comprises a plurality of delegate objects, each comprising a different externally addressable network address such that the remote delegate service applies a different access policy to the self-protected data object for each of the plurality of delegate objects.

15. The system of claim 14 wherein at least a subset of the plurality of data objects are instantiated until a successful authentication is encountered.

16. The system of claim 10 wherein execution of the instructions further incorporates a copy of the one or more user authentication credentials specific to the self-protected data object into the self-protected data object such that the one or more user authentication credentials are available as a cached copy absent access to the remote delegate service.

17. The system of claim 16 wherein the cached copy of the authentication credentials are disabled upon expiration of a time to live period.

18. The system of claim 16 wherein the cached copy of the authentication credentials are disabled an attempt to access the data object from an unauthorized domain.

* * * * *